United States Patent [19]
Clikeman et al.

[11] Patent Number: 5,835,174
[45] Date of Patent: Nov. 10, 1998

[54] DROPLETS AND PARTICLES CONTAINING LIQUID CRYSTAL AND FILMS AND APPARATUS CONTAINING THE SAME

[75] Inventors: Richard Roy Clikeman, Washington Crossing, Pa.; Morris Christopher Wills, Roebling, N.J.; Peter Reeves Sperry, Doylestown, Pa.; Martin Vogel, Jenkintown, Pa.; Jiun-Chen Wu, Robbinsville, N.J.; Willie Lau, Ambler, Pa.

[73] Assignee: Rohm and Haas Company, Philadelphia, Pa.

[21] Appl. No.: 704,316

[22] Filed: Sep. 19, 1996

Related U.S. Application Data

[60] Provisional application No. 60/005,269, Oct. 12, 1995.

[51] Int. Cl.$^6$ ................................................. G02F 1/1333
[52] U.S. Cl. ................................. 349/86; 349/89; 349/92
[58] Field of Search .................................. 349/86, 92, 89

[56] References Cited

U.S. PATENT DOCUMENTS

| | | |
|---|---|---|
| 2,790,736 | 4/1957 | McLaughlin et al. . |
| 3,037,952 | 5/1962 | Jordan et al. . |
| 4,283,499 | 8/1981 | Howell . |
| 4,308,164 | 12/1981 | Aftergut et al. . |
| 4,435,047 | 3/1984 | Fergason . |
| 4,556,289 | 12/1985 | Fergason . |
| 4,579,423 | 4/1986 | Fergason . |
| 4,591,233 | 5/1986 | Fergason . |
| 4,596,445 | 6/1986 | Fergason . |
| 4,603,945 | 8/1986 | Fergason . |
| 4,605,284 | 8/1986 | Fergason . |
| 4,606,611 | 8/1986 | Fergason . |
| 4,613,207 | 9/1986 | Fergason . |
| 4,616,903 | 10/1986 | Fergason . |
| 4,643,528 | 2/1987 | Bell, Jr. . |
| 4,662,720 | 5/1987 | Fergason . |
| 4,669,828 | 6/1987 | Parker . |
| 4,693,560 | 9/1987 | Wiley . |
| 4,699,470 | 10/1987 | McLaughlin et al. . |
| 4,707,080 | 11/1987 | Fergason . |
| 4,732,456 | 3/1988 | Fergason et al. . |
| 4,772,102 | 9/1988 | Fergason et al. . |
| 4,789,858 | 12/1988 | Fergason et al. . |

(List continued on next page.)

FOREIGN PATENT DOCUMENTS

| | | |
|---|---|---|
| 42089/72 | 5/1972 | Australia . |
| 0 345 029 | 6/1989 | European Pat. Off. . |
| 0 345 029 | 12/1989 | European Pat. Off. . |
| 58-501631A | 9/1983 | Japan . |
| 3-505932 | 12/1991 | Japan . |
| 3505932 | 12/1991 | Japan . |
| 6-095082A | 4/1994 | Japan . |
| 7-098449A | 4/1994 | Japan . |
| 6505814 | 6/1994 | Japan . |
| 7-261163A | 3/1995 | Japan . |
| 7504763 | 5/1995 | Japan . |
| 7-281158A | 6/1995 | Japan . |
| 7-301785A | 5/1996 | Japan . |
| 7-325294A | 7/1996 | Japan . |
| WO 92/14184 | 8/1992 | WIPO . |
| WO 95/25777 | 9/1995 | WIPO . |
| WO 96/13561 | 5/1996 | WIPO . |

*Primary Examiner*—Hung X. Dang
*Assistant Examiner*—Tiep H. Nguyen
*Attorney, Agent, or Firm*—John L. Lemanowicz; Darryl P. Frickey

[57] ABSTRACT

Disclosed are uniformly sized domains of liquid crystals, a method for forming the domains, and their performance in polymer dispersed liquid crystal displays. The method provides the ability to form discrete domains of liquid crystal surrounded by a polymer shell, also known as polymer encased liquid crystals, or PELCs. Further, the method provides for the ability to make PELCs that have uniformly sized particles. Displays made comprising uniformly sized PELCs demonstrate markedly improved electro-optical performance over displays made by conventional polymer dispersed liquid crystal processes.

20 Claims, 9 Drawing Sheets

U.S. PATENT DOCUMENTS

| | | |
|---|---|---|
| 4,806,922 | 2/1989 | McLaughlin et al. . |
| 4,810,063 | 3/1989 | Fergason . |
| 4,824,208 | 4/1989 | Fergason et al. . |
| 4,832,458 | 5/1989 | Fergason et al. . |
| 4,844,596 | 7/1989 | Fergason . |
| 4,856,876 | 8/1989 | Fergason . |
| 4,878,741 | 11/1989 | Fergason . |
| 4,884,873 | 12/1989 | Fergason . |
| 4,950,052 | 8/1990 | Fergason et al. . |
| 4,991,940 | 2/1991 | Dalisa et al. . |
| 4,992,201 | 2/1991 | Pearlman . |
| 5,052,784 | 10/1991 | Fergason . |
| 5,075,789 | 12/1991 | Jones et al. . |
| 5,076,668 | 12/1991 | Dalisa et al. . |
| 5,082,351 | 1/1992 | Fergason . |
| 5,089,904 | 2/1992 | Fergason . |
| 5,103,326 | 4/1992 | Fergason . |
| 5,107,352 | 4/1992 | Fergason . |
| 5,132,815 | 7/1992 | Fergason . |
| 5,136,403 | 8/1992 | Jones et al. . |
| 5,142,389 | 8/1992 | Fergason . |
| 5,168,380 | 12/1992 | Fergason . |
| 5,202,063 | 4/1993 | Andrews et al. . |
| 5,206,757 | 4/1993 | Wiley et al. . |
| 5,208,686 | 5/1993 | Fergason . |
| 5,216,530 | 6/1993 | Pearlman et al. . |
| 5,233,445 | 8/1993 | Kamath et al. . |
| 5,237,004 | 8/1993 | Wu et al. .................................. 525/85 |
| 5,283,563 | 2/1994 | Allen et al. . |
| 5,285,299 | 2/1994 | Drziac et al. . |
| 5,307,185 | 4/1994 | Jones et al. . |
| 5,328,580 | 7/1994 | Reamey . |
| 5,335,101 | 8/1994 | Reamey . |
| 5,345,322 | 9/1994 | Fergason . |
| 5,395,550 | 3/1995 | Lau . |
| 5,405,551 | 4/1995 | Reamey et al. ........................... 359/51 |
| 5,427,713 | 6/1995 | Wartenberg et al. . |
| 5,521,266 | 5/1996 | Lau . |
| 5,585,947 | 12/1996 | Havens et al. ........................... 349/92 |

PDLC WITH WIDE LC PARTICLE SIZE DISTRIBUTION
(34 MICRONS)

$V10 := 4.8 \quad V90 := 14.1$
$S := \dfrac{V90}{V10} \quad S := 2.938 \quad Nmax = 1.6$ $Nmax := \left(\dfrac{S^2 + 1}{S^2 - 1}\right)^2$

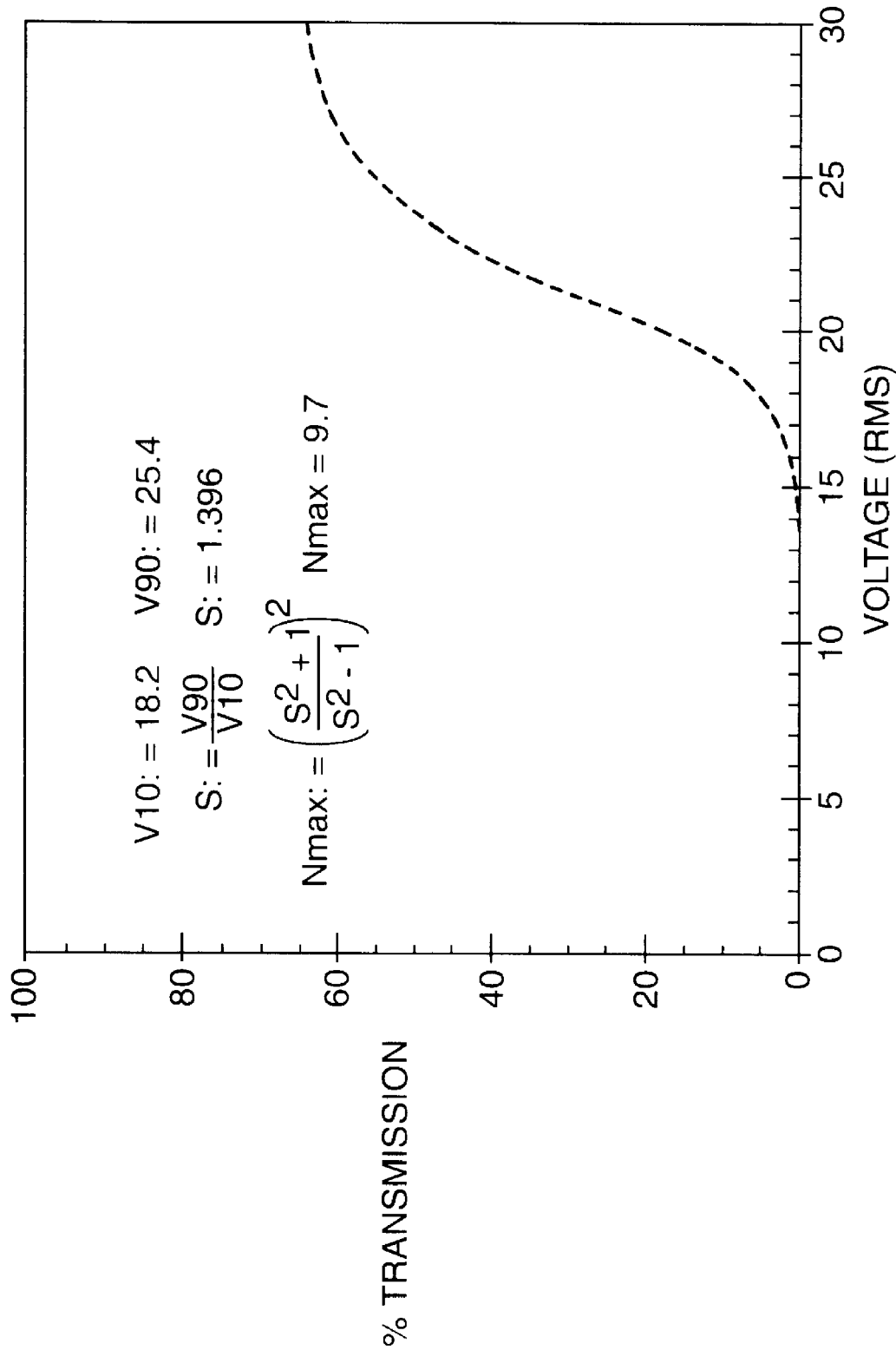

DROPLETS AND PARTICLES CONTAINING LIQUID CRYSTAL AND FILMS AND APPARATUS CONTAINING THE SAME

FIELD OF THE INVENTION

The present invention relates to a method for forming, in an aqueous medium, particles and droplets containing liquid domains. In particular, the present invention relates to a method for forming, in an aqueous medium, particles containing liquid crystal domains and having a narrower particle size distribution than liquid crystal domains prepared from conventional processes. The present invention also relates to liquid crystal-containing particles formed by the disclosed method, and to films containing the liquid crystal-containing particles. Liquid-crystal containing particles made according to the present method exhibit improved electro-optic properties over conventional liquid crystal particles when incorporated into polymer dispersed liquid crystal films.

BACKGROUND OF THE INVENTION

Materials other than liquid crystals may be contained within droplets formed according to the method of the present method. Such material may be any organic liquid and preferably has a low water solubility, as discussed herein below. The liquid material may also be a solution of a material which is normally a solid at room temperature. One or more materials may be used in combination with, or in place of, a liquid crystalline material. As used herein, the term "organic liquid" includes reagents, adjuvants, and other chemically or biologically active species. Examples include inks, toners, dyes, flavors and fragrances. Other examples include biocides such as pesticides, herbicides, mildicides, insecticides and fungicides, marine anti-fouling agents, pharmaceutically acceptable agents, and the like. The organic liquids used in this manner according to the present invention may be pure liquids, mixtures or solutions of solid or liquid species in organic solvents. The organic liquid may be removed by evaporation, for example during film formation, leaving a void, or air or another gaseous material, within the particle.

Alternatively, material contained within the droplets may be inorganic or partially inorganic in nature, or may be comprised of precursors of inorganic species. For example, appropriately functionalized organic species could be chemically, or otherwise, converted to inorganic salts or complexes while in the droplet. Such appropriately functionalized organic species could themselves be part of a mixture or solution with one or more additional liquid or solid species. Complexes of organic ligands with metals may also be incorporated into the droplets. As discussed herein, the method of the present invention, is particularly useful in forming uniformly sized polymer particles containing liquid crystal material.

Applications for liquid crystals include: computer display screens; wristwatches; architectural windows; privacy windows; automotive windows; automobile sunroofs; switching devices such as for optics systems, projection display devices; reflective display devices; hand-held paging devices; cellular phones; laptop computers; television screens including car-mounted television screens; automotive displays including radio, dashboard, and on-board navigation systems; helmet displays such as "heads-up" displays; cockpit displays; imaging devices; virtual reality devices; simulation devices; electronic gating devices; diffraction gratings; and calculators. In these applications and others, the liquid crystal devices may be monochromatic or polychromatic.

Liquid crystal molecules are generally rod-like or disk-like in shape, and have physical properties which are intermediate between those of a crystalline solid and those of an amorphous liquid. The molecules are generally substituted biphenyl or triphenyl, wherein one of the phenyl groups may be separated from the other or others by a spacer group. Examples of liquid crystal materials include: compounds having the formula

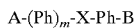

wherein m is an integer from 1 to 5; A and B are independently selected from: $C_1$–$C_8$ alkyl groups; halogens; cyano groups; haloalkyls; vinylene, acetylene, azo, and azoxy moieties; alkoxy groups having the formula $C_nH_{2n+1}O$, wherein n is an integer from 1 to 8, and ester groups having the formula $C_nH_{2n+1}COO$, wherein n is an integer from 1 to 8. X is a spacer group selected from: $C_1$–$C_8$ alkylene esters; $C_nH_{2n}$ alkyl, wherein n is an integer from 1 to 8; vinylene, acetylene, azo and azoxy groups; and azomethine linkages.

Other examples include biphenyl compounds having the formula A-Ph-Ph-B, wherein A and B are independently selected from: cyano group; halogens; alkoxy groups having the formula $C_nH_{2n+1}O$, wherein n is an integer from 1 to 8, and ester groups having the formula $C_nH_{2n+1}COO$, wherein n is an integer from 1 to 8.

Triphenyl liquid crystal materials may have, for example, halogen, cyano, haloalkyl and alkyl substituents. Another example of a triphenyl liquid crystal material is 4-cyano-4'-(4-[n-pentyl]phenyl)biphenyl. Biphenyl and triphenyl liquid crystal materials are well known in the art and are commercially available.

Common liquid crystal materials are rod-like molecules which can be aligned by an electric or magnetic field, or by a surface. Conventional liquid crystal display (LCD) devices rely on the ability of liquid crystal molecules to align with electric fields and surfaces. Polymer dispersed liquid crystal (PDLC) devices, discussed below, rely upon the ability of liquid crystal (LC) molecules to align with electric fields and with surfaces, and also upon the fact that the extent to which the liquid crystal molecules refract, or bend, light is dependent upon the orientation of individual molecules with respect to incident light. An indicator of the capacity of the molecules to refract light is the index of refraction, or refractive index, discussed below.

Liquid crystal devices, or LCDs can contain a range of liquid crystal types that include but are not limited to nematic, twisted nematic, super twisted nematic, cholesteric, ferroelectric liquid crystals. Such types are well known in the art.

Another type display utilizing liquid crystals relies on liquid crystal domains dispersed within a polymer matrix. A liquid crystal domain is a region occupied exclusively or predominantly by liquid crystal molecules. This type of liquid crystal display is known as a polymer dispersed liquid crystal display (PDLC). PDLCs are often used in the form of thin films, meaning films having a thickness of up to about 200 microns, typically a thickness of between 2 microns and 50 microns. The ability of the PDLC device to transmit light, ("on state") or scatter light (in the opaque "off state") is dependent upon the relative ability of the LC domain and the polymeric phase to refract light, as indicated by the so called refractive index. The refractive index of a material is the ratio of the velocity of light in a vacuum to the velocity of light in the material. The angle of refraction varies with the wave-length of the light used. The refractive index is typically represented by h, with a superscript usually added to indicate the temperature at which a measurement is made and a subscript is used to indicate the wavelength of the light source. (The Chemist's Ready Reference Handbook, G. J. Shugar and J. A. Dean, McGraw-Hill, Inc., New York, 1989). For a typical organic material, the refractive index may range from about 1.4 to about 2, and is calculated by the formula $$h=c/v$$

where h is the refractive index, c is the speed of light in a vacuum and v is the speed of light in a given material.

The ability of an electric field to influence the extent of refractive index matching is due to the fact that liquid crystals exhibit differing indices of refraction, dependent upon their orientation with respect to incident light. When light passes through a liquid crystal medium along the long axis of the molecules, the refractive index measured is called its ordinary refractive index. When light passes through a liquid crystal molecule perpendicular to its long axis, the refractive index measured is defined as its extraordinary refractive index. In a PDLC device, the orientation of the liquid crystal molecules with respect to incident light is affected by the presence or absence of an electric, or alternatively magnetic, field such that the liquid crystals will express an ordinary refractive index or an extraordinary refractive index as a function of the applied field being either on or off, respectively. In the instance where the ordinary refractive index of the liquid crystal droplets is matched closely with the refractive index of the surrounding polymer matrix, light incident on a film comprising liquid crystal droplets and polymer is not refracted and the film is substantially transparent. In the instance where the extraordinary refractive index of the liquid crystal droplets does not match the refractive index of the surrounding polymer matrix, and the LC droplets are provided with the correct size and geometry, light incident on a film comprising liquid crystal droplets and polymer is refracted and the film is substantially opaque.

The size of the LC droplets, or alternatively referred to herein as LC domains, also has a profound effect upon the electro-optical characteristics of PDLC films. When LC and surrounding polymeric matrix have the same refractive index, the film will be transparent regardless of the size of the domains. When the refractive indecies of the LC droplets and the polymer matrix are not matched, however, domain size, domain size distribution, and number of domains determine the extent to which light is scattered. Ideally, the polymeric matrix of a PDLC is chosen such that its index of refraction matches the ordinary index of refraction of the LC domain As described hereinabove, when both LC and polymer have the same refractive index, transparency is achieved. The closeness of the matching of the indices, or the "index matching", may be selected based on the desired degree of contrast and transparency in the device. Mismatched refractive indices cause light to scatter with the result that opacity is achieved. For transparency, the ordinary index of refraction of the liquid crystal and the index of refraction of the polymer will preferably differ by no more than 0.03, more preferably no more than 0.01, and most preferably by no more than 0.001. The acceptable difference will depend on LC domain size. LC domain sizes on the order of the wavelength of the light being refracted will give maximum scattering. Domain sizes less than about 1/10th the wavelength of the light being refracted will not scatter light significantly even if the refractive indices of LC and polymer are mismatched.

A disadvantage of conventional PDLCs is an undesirably high switching voltage. Switching voltage is a voltage that is required to orient the LC molecules normal to the substrate conducting surfaces, thereby creating a transparent state. This voltage, $V_{ON}$, is typical from 70 to 100 percent ($V_{70}$–$V_{100}$) of the transition in transparency from the film's most opaque state to its most transparent state, preferably from 75 to 95 percent and most preferably from 80 to 90 percent of the transition in transparency from the film's most opaque state to its most transparent state. Similarly, there is a voltage, $V_{OFF}$, for which the film will be in a relatively opaque state. Typically voltage $V_{OFF}$ is from 0 to 30 percent ($V_0$–$V_{30}$) of the transition in transparency from the film's most transparent state to its most opaque state, preferably from 5 to 25 percent and most preferably from 10 to 20 percent of the transition in transparency from the film's most transparent state to its most opaque state.

Commercially available PDLC devices require switching voltages of about 40 volts. These voltage requirements exclude PDLC devices from many applications. Preferably, switching voltages of about 8 volts are desirable in order to access a broader range of applications. It is desirable to have as low a switching voltage as possible, in order to reduce energy requirements and to increase battery life.

The surface of the polymeric wall surrounding an LC domain in a PDLC film exerts a force upon the liquid crystal molecules of that domain such that liquid crystal molecules in contact with the polymer surface, or substantially close to the polymer surface, will behave differently in the presence and the absence of an applied field than those liquid crystal molecules not in contact with or substantially close to the polymer surface. The magnitude of that force, called the anchoring force, depends upon, for example, liquid crystal and polymer composition, but it also depends upon proximity of LC molecules to the polymer wall. The anchoring force experienced by an LC molecule decreases as its distance from the wall increases.

The polymer-wall surface area encountered by liquid crystal molecules in PDLC films depends on size of the liquid crystal domain (the term "wall" is used to describe that area of the polymer in contact with the liquid crystal domains). For example, two PDLC films, each of which contains the same total volume of spherical LC domains with each film containing spherical LC domains having a single diameter, and the LC domain diameter in one film is twice that in the other. In the film containing the smaller domains, there will be eight times as many domains as in the film containing large domains. The total wall surface area of the set of small domains will be twice the total wall surface area for the large domains due to the dependence of surface area upon the square of the radius. All other things being equal, a PDLC film containing smaller domains will have a larger fraction of its LC molecules in close contact with the polymer wall, and will require more applied voltage to align the LCs parallel with an applied field than is required for LC molecules in larger domains.

Conventional PDLC preparative methods resulted in broad distributions for the shapes and sizes of LC domains. This is true for all of the phase separation techniques. Commonly used phase separation techniques are thermally, solvent, and polymerization induced phase separation, known by the acronymns TIPS, SIPS, and PIPS, respectively and are well known in the art. Such phase separation usually occurs via one of two fundamental processes, nucleation and growth or spinodal decomposition. In the former, domains nucleate at different times and grow at different rates to give a broad distribution of domain sizes. In the latter, nearly instantaneous phase separation produces lacy bicontinuous structures which, by their very nature, exhibit a variety of shapes and sizes. Techniques involving aqueous emulsions of liquid crystal molecules, e.g., known in the art as the so called NCAP process for forming Nematic Curvilinear Aligned Phases, also produce broadly distributed LC domain sizes characteristic of mechanical emulsification. (P. S. Drzaic, "Liquid Drystal Dispersions" World Scientific, River Edge, N.J., 1995.)

As a consequence of having broadly distributed LC domain sizes, as one applies a field of increasing voltage to a PDLC film, the largest domains and the most spherical domains, i.e., those having the lowest ratio of surface area to LC volume, align normal to the applied field first. Progressively smaller and less regularly shaped domains then begin to align normal to the applied field (also known as "switching") at higher and higher voltages until, finally, the peak voltage (the lowest voltage giving maximum transparency) is reached. In this way, the presence of many domain sizes in a single PDLC film leads to a broad transition in the graph of light transmission versus. voltage. Such broad transitions have excluded PDLC films from use in applications, such as pagers and cellular phones, where multiplexing, discussed below, is highly desired. Additionally, forward and backward scatter of light, off-angle haze in the electrically ON state, and wave length dependent optical properties are extremely sensitive to LC domain size.

Hand-held devices such as pagers and cellular phones have relatively simple displays, generally comprised of a single row of alphanumeric characters, i.e., letters such as, D, X and Z as well as numbers such as 1, 7 and 9, for example. Each character is made up of pixels. Various techniques for applying a voltage to one or more pixels in a plurality of pixels comprising a display application include, but are not limited to: direct drive, passive matrix addressing, and active matrix addressing. These techniques are known in the art. Conventional PDLC technology is not applicable to the use of passive matrix addressing. The following relationship is known as the iron law of multiplexing. (P. M. Alt and P. Pleshko, IEEE Trans. Elec. Dev. ED-21, 146 (1974))

$$N_{max}=[(s^2+1)/(s^2-1)]^2 \text{ where } s=V_{ON}/V_{OFF}$$

Muliplexing allows to greatly reduce the number of display interconnections by addressing matrix row and column electrodes rather than individual pixel electrodes. $N_{max}$ defines the maximum possible number of row electrodes that can be addressed.

Convential PLDC devices transition from $V_{OFF}$ to $V_{ON}$ over a broad range of voltages with $N_{max}$ of 3 or less. The ability to have $N_{max}$ of 4 is highly desirable thereby providing PDLC devices suitable for passive matrix addressing and therefore a highly desired display technology for such applications as pagers and cellular phones utilizing English language characters. PLDC devices with $N_{max}$ of about 8 or greater would enable use of PDLC devices for displaying more complex characters such as Kanji characters.

SUMMARY OF THE INVENTION

According to a first aspect of the present invention there is provided a method for forming seed particles having a polydispersity of less than 1.3, said method comprising:

1) forming a pre-seed emulsion of particles by polymerizing one or more first ethylenically unsaturated monomers, and 2) forming an emulsion of seed particles by aqueous emulsion polymerization, in the presence of said pre-seed emulsion, of one or more second ethylenically unsaturated monomers.

According to a second aspect of the present invention there is provided a method for forming particles containing liquid crystal material and having a polydispersity of less than 1.3, said method comprising:

1) forming a pre-seed emulsion of particles by polymerizing one or more first ethylenically unsaturated monomers;

2) forming an emulsion of seed particles by aqueous emulsion polymerization, in the presence of said pre-seed emulsion, of one or more second ethylenically unsaturated monomers;

3) adding to said emulsion of seed particles one or more liquid crystal materials, to form an emulsion of seed particles and liquid crystal material, and 4) causing said liquid crystal material and said seed particles to form substantially monodisperse droplets containing liquid crystal and seed.

Another aspect of the present invention is a plurality of discrete polymer particles containing liquid crystal domains, said polymer particles having a polydispersity of less than 1.3

Another aspect of the present invention is a method for forming liquid crystal domains having a particle size of from 0.150 micron to 15 microns and a polydispersity of less than 1.3.

A further aspect of the present invention is a plurality of discrete polymer particles containing liquid crystal domains wherein each liquid crystal domain comprises liquid crystalline material and seed at a ratio of from 1:1 to 1500:1, and wherein said plurality of polymer dispersed liquid crystal domain sizes has a polydispersity less than 1.01. The particles formed by the method of the present invention have sizes within the range from about 0.150 micron to about 15 microns.

Another aspect of the present invention provides a polymer dispersed liquid crystal device comprising the polymer particles containing liquid crystal domains of the present invention, said device having a switching voltage of less than 1.2 volt per micron thickness of film.

The present invention further comprises liquid crystal apparatus, comprising liquid crystal means for selectively scattering or transmitting light in response to a prescribed input said liquid crystal means comprising uniformly sized particles having operationally nematic liquid crystal domains encased in a continuous polymer shell, said particles having particle sizes ranging from 0.150 microns to 15 microns in diameter and polydispersities of less than 1.3, and further containing a support medium means of supporting said liquid crystal means. The construction of which is comprised of two substrates, generally glass or plastic sheets, are disposed opposite to each other through a polymer dispersed liquid crystal layer. Each substrate further contains a electrically conductive layer next to the polymer dispersed liquid crystal layer. Such designs are well known in the art and are disclosed in U.S. Pat. Nos. 4,435,047, 4,591,233, and 4,810,063.

The liquid crystal apparatus further comprising a reflecting means for effecting internal reflections of light scattered by said liquid crystal; said support medium means having a viewing side for emitting at least some light scattered by said liquid crystal means and an opposite side relative to the viewing side and further comprising optical absorbing means or absorbing light through said opposite side of support medium means.

DESCRIPTION OF THE PREFERRED EMBODIMENTS

The present invention seeks to overcome several disadvantages of the current technology for liquid crystal materials by providing a means for forming PDLCs having liquid crystal domains of uniform size. The liquid crystal domains exhibit many advantageous over conventional PDLC properties that include but are not limited to: lower switching voltage; reduced off-angle haze; ability to use passive matrix addressing; control scattering phenomenon such as contrast, transparency, and opacity; and improved switching on and off times. This is accomplished by forming polymeric particles of controlled size and with uniform particle size distribution which are filled with liquid crystal material and controlling the composition of the polymer. The polymeric particles of the present invention are called "polymer encased liquid crystals" (PELC).

It has been surprisingly found that liquid crystal domains of uniform size and controlled diameter may be obtained by swelling of seed particles with a liquid crystalline material.

Without intention to be bound by any theory, it is thought that this unexpected result is achieved due to the thermodynamically controlled transport of the LC into the seed particles. The liquid crystalline material swells the seed particles and forms droplets having domains containing liquid crystal and seed. The liquid crystalline domains are dispersed in an aqueous medium. The weight ratio of liquid crystal to seed preferably ranges from 1500:1 to 1:1, more preferably 1000:1 to 10:1, and most preferably 750:1 to 50:1.

The seed particles made according to the method of the present invention may be swelled, or filled, with liquids other than, or in addition to, liquid crystal material. In the present method, this is called "primary swelling". Liquids useful for swelling the seed particles according to the method of the present invention are liquids having a low water solubility. As used herein, the term "water soluble" means completely soluble in water; "having low water solubility" means having a water solubility at 25°–50° C. of no greater than 200 millimoles/liter; and the term "having very low water solubility" means having a water solubility at 25°–50° C. of no greater than 50 millimoles/liter. Although other liquids may be employed, preferably, liquids used for swelling the particles have a very low water solubility, and more preferably, a water solubility of 10 millimoles/liter or below at 25°–50° C.

The method of the present invention produces a plurality of domains of uniform size. As used herein, the term "domains of uniform size" refers to domains having a size distribution which is substantially monodisperse. Those with skill in the art will understand that domains as used herein is broadly defined to encompass droplets, particles, the core of polymer encapsulated liquid crystals and domains in polymer dispersed liquid crystal films. The term "monodisperse" refers to a domain size distribution, or polydispersity (PD), of exactly 1. Polydispersity is known in the art as an indicator of the breadth of the domain size (or particle size) distribution. Polydispersity as used herein is calculated from the weight average size, $d_w$, and the number average size, $d_n$, by the formulae:

$PD = (d_w)/(d_n)$.

$d_n = \Sigma n_i d_i / \Sigma n_i$ $d_w = \Sigma n_i d_i d_i / \Sigma n_i d_i$ where $n_i$ is the number of domains having the particle size di.

The uniform LC domains of this invention may be present as droplets dispersed in an aqueous phase. The aqueous dispersion of LC droplets may also be combined with a water soluble polymer such as poly(vinyl alcohol) or a latex polymer such as polyurethane or (meth)acrylic copolymer and formed into a film by coating a surface and evaporating the water. The LC domains in aqueous dispersion may alternatively be converted to polymer encased liquid crystal (PELC) particles in which the LC domain forms a core surrounded by one or more polymeric shells. The PELC particles so formed can then be dried to form a powder comprising individual particles of LC molecules surrounded by one or more polymer shells. An aqueous dispersion of PELC particles may also be spread across a surface using a Doctor blade, or other device known to the art, to form an aqueous film from which water and any other volatiles can be removed to form a dry film.

Optionally, the aqueous dispersion of PELC particles may contain one or more water soluble polymers or latex polymers that can serve to bind the PELC particles together as a component of a polymer dispersed liquid crystal matrix. Once incorporated into a PDLC matrix, the LC cores of the PELC particles function as the switchable LC domains of the PDLC film.

Aqueous dispersions of uniform LC droplets make it possible to form PDLC films having LC domains of more narrowly distributed size than can be achieved by conventional aqueous emulsion techniques. However, there is a tendency of the droplets made by conventional aqueous emulsion techniques to coalesce to some extent, thereby broadening the LC domain size distribution in resultant PDLC films. Such coalescence is completely avoided by first forming one or more polymeric shells around each LC domain (i.e., form PELC particles of the present invention) prior to film formation. The presence of the polymeric shell of a given PELC particle effectively prevents its LC core from coalescing with the LC cores of immediately adjacent PELC particles, and the narrow particle size distribution created during synthesis is fully retained upon film formation.

The particle size distribution of the liquid crystal domains and the liquid crystal-containing particles formed by the method of the present invention is narrower than that of typical liquid crystal domains formed by conventional methods. By the method of the present invention, liquid crystal domains and liquid crystal containing particles may be obtained which have a polydispersities below 1.3, preferably less than 1.1. The size distributions of the liquid crystal droplets and PELC particles formed by the method of the present invention are influenced by the particle size distributions of the seed particles used in forming them. Under optimal conditions, particles may be obtained having a polydispersity of less than 1.01, preferably less than or equal to 1.005. In contrast, liquid crystal domains made by conventional techniques have polydispersities greater than or equal to 1.5.

The liquid crystal particles of the present invention may be used to form films. It has also been unexpectedly discovered that PDLC films made from particles formed by the present method may be switched at a voltage of less than 10 volts for a 10 micron thick film. As used throughout this specification, switched is understood to mean a PDLC film changing from a substantially opaque state to a substantially transparent state. Films made from particles formed by the present method have switching voltages of about 1.2 V per micron thickness or less. Preferably, films may be made from particles formed by the present method having a switching voltage of less than about 1.0 V per micron thickness of film, and more preferably, 0.5 V or less per micron thickness of film.

A further result of the present method is a film comprising uniformly sized PELC particles or uniformly sized liquid crystal droplets that can be multiplexed, or alternatively stated, have $N_{max}$ greater than 2. The present invention provides levels of multiplexing providing for the capability to display 7-segment, or alpha-numeric, characters, i.e., $N_{max}$ values of greater than about 4. The present invention provides levels of multiplexing providing for the capability to display 13-segment, or Kanji, characters, i.e., $N_{max}$ values of greater than about 8. The present invention provides even higher levels of multiplexing capabilities, i.e., $N_{max}$ values of greater than about 23.

A further result of the present method is the narrow voltage range over which a film comprising uniformly sized PELC particles or uniformly sized liquid crystal droplets of the present invention will turn from a substantially opaque state to one of substantially transparent. This range may be referred to as the "switching sharpness parameter". The switching sharpness parameter is defined as the voltage range over which the film switches from a substantially opaque state ($V_{OFF}$) to a substantially transparent state ($V_{ON}$), and can be expressed according to:

Switching Sharpness Parameter=$V_{ON}$-$V_{OFF}$.

For a 10 micron thick film, for example, particles prepared according to the method of the present invention will result in a switching sharpness parameter of less than 3 volts, preferably less than 2 volts, and more preferably less than 1 volt. A narrower sharpness parameter provides for larger $N_{max}$.

A further result of the present invention is the substantial absence of hysteresis in PDLC display applications, typically less than 8%, preferrably less than 4%, and most preferably less than 2%. Hysteresis is the phenomenon in which the response of the liquid crystals within one or more domains comprising a plurality of domains in a display device is substantially different in the voltage transition $V_{ON}$ to $V_{OFF}$ compared to the transition $V_{OFF}$ to $V_{ON}$ and is given by the following equation:

Hysteresis=$(V_{50u}-V_{50d})/((V_{50u}+V_{50d})/2)))100$

Where $V_{50u}$ is the voltage where 50% of the transition in transparency from the film's most opaque state to its most transparent state is reached with increasing voltage and $V_{50d}$ is the voltage where 50% of the transition in transparency from the film's most opaque state to its most transparent state is reached with increasing voltage.

The present invention provides for a means to optimize contrast between the on state and off state. The improvement in contrast is provided by controlling the size (diameter) of PELC particles or domains of liquid crystals.

A further advantage of improved contrast is increased levels of multiplexing. PDLC films with high contrast between the on state and off state provide for flexibility in selecting $V_{OFF}$ and $V_{ON}$ such that the levels of multiplexing can be increased.

A further advantage of the present invention is that films made from PELCs have reduced off-angle haze compared to conventional PDLC films. Polymer dispersed liquid crystal films are often used in architectural window applications as a light valve to alternately allow and block the transmission of light. Privacy, and protection from sun light, are achieved without recourse to mechanical blinds in these, so called, smart windows. These windows, unfortunately, often suffer from high off-angle haze. In the ON-state, the window appears transparent when viewed normal (0°) to the plane of the window. If an observer moves from a position normal to the plane of the window, for example, about 30° relative to normal, the window is still transparent (and still reveals what is on the other side), but the image is hazy. This phenomenon is called "off-angle haze" and is well know in the art.

Without intention to be bound by any theory, the source of this objectionable haze becomes apparent upon realization that the angle between incident light and the major axis of the aligned liquid crystal molecules in the ON-state must be 0° if the full effect of the ordinary refractive index is to be observed. Deviation from that angle causes a shift in the liquid crystal refractive index toward the extraordinary value. The resulting mismatch between refractive indices of liquid crystalline domains and polymeric matrix, increases light scattering, and is seen as haze.

The present invention provides a means for reducing the off-angle haze prevelant in convential PDLC films through the use of liquid crystals having reduced difference between ordinary and extraordinary refractive indicies and also through control of the particle diameter. It is believed that control of particle size results in minimization of off-angle haze in the on state and maximization of scattering in the off state. A broad distribution of domain particle sizes would, result in a significantly less opaque OFF-state which, in turn, would translate into lower contrast.

To prepare liquid crystal droplets and PELCs of the present invention, an aqueous emulsion of liquid crystal material is combined with an aqueous emulsion of seed particles. Alternatively, another liquid material may be used in place of, or in combination with, liquid crystal material. The liquid material may be organic, inorganic or mixtures thereof. In addition, the liquid material may contain disolved, or partially dissolved solid material. Organic shall mean to be comprised substantially of hydrogen and carbon atoms. Organic may also incorporate other atoms such as oxygen, sulfur, nitrogen and hologens and isotopes thereof. Inorganic shall mean to be comprised substantially of all other atoms not described herein as organic. Inorganic materials may also be derived from precursor materials that in and of themselves may or may not be inorganic. Preferably, the combined emulsions are mechanically agitated at a rate sufficient to cause intimate mixing of the two emulsions but not so severe that shear forces cause coalescence or particles or particle breakdown. The seed particles are swelled by the liquid material, forming droplets. Following this primary swelling, the droplets may optionally be further swelled by the addition of monomer, and the monomer may be polymerized.

In a preferred embodiment of the invention, conventional liquid crystals are employed as the liquid. Commercially available liquid crystal materials useful in the present invention are E7, E9, and TL-205 from E. Merck Co. (Germany). Other liquid crystal materials useful in the present invention are listed in U.S. Pat. No. 4,308,164, and in Chandrasekhar, S., *Liquid Crystals,* 2nd Edn.; Cambridge University Press: Cambridge, 1992. A mixture of two or more liquid crystal materials may be used in the method of the present invention.

The seed particles are prepared in an aqueous emulsion from one or more ethylenically unsaturated monomers. Emulsion polymerization techniques are known to those skilled in the art. For example, emulsion polymerization techniques are discussed in U.S. Pat. Nos. 3,037,952 and 2,790,736. Emulsion polymerization techniques are also discussed in *Emulsion Polymerisation Theory and Practice,* D. C. Blackley, Applied Science Publishers Ltd., London (1975). In emulsion polymerization methods, a surfactant is typically used, and the size of the seed formed is partly determined by the amount and type of surfactant. For purposes of the present invention, it is desirable to form seed with particle diameters of a size range from about 50 nanometers to about 1 micron, preferably from about 150 nanometers to about 500 nanometers, and more preferably about 200 nanometers (Wu et al., U.S. Pat. No. 5,237,004; see, for example, examples 1, 5, and 6). The particle size desired for the seed particles is determined by the target particle size for the liquid crystal domains. Larger seed diameters, up to about 5 microns, can be achieved by non-emulsion processes whereby an emulsion-derived seed is swollen with monomer and polymerized. Particles of a useful size range may be prepared with surfactant concentrations of from about 0.1 weight percent to about 5 weight percent, based on the total weight of monomers and liquid crystal, depending on the type of surfactant used. When non-ionic surfactants are used, it may be preferred to use up to about 10 weight percent surfactant.

Common surfactants are well known to those skilled in the art, and may be found in, for example, Porter, M. R., *Handbook of Surfactants*, Chapman and Hall, New York, 1991. Examples of useful surfactants for the present invention include ionic surfactants such as, for example, sodium lauryl sulfate, dioctylsulfosuccinate, sodium polyoxyethylene lauryl ether sulfate, sodium dodecyl benzenesulfonate; and non-ionic surfactants such as, for example, glycerol aliphatic esters, polyoxyethylene aliphatic esters, polyoxyethylene alcohol ethers; and stearic acid monoglyceride.

The seed particles comprise polymer chains. The seed particles may be formed by polymerization in the presence of a pre-seed emulsion. The pre-seed emulsion is an emulsion of polymeric particles and is also formed by well-known aqueous emulsion methods. The pre-seed polymer may be crosslinked. As is well known to those skilled in the art, crosslinking may be achieved by the use of polyethylenically unsaturated monomers such as polyethylenically unsaturated acrylates and methacrylates or polyethylenically unsaturated aromatic monomer such as divinyl benzene.

Examples of polyethylenically unsaturated monomers useful as crosslinkers for forming the pre-seed emulsion include allyl methacrylate (ALMA); dicyclopentenyl acrylate and methacrylate; glycidyl methacrylate; glycidyl acrylate; acrylate and methacrylate esters of neopentyl glycol monodicyclopentenyl ether, epoxy-containing acrylates and methacrylates; divinyl benzene and dicyclopentenyloxyethyl acrylate and methacrylate.

Ethylenically unsaturated monomers useful in forming the seed and pre-seed particles include vinylaromatic monomers such as styrene, α-methylstyrene, vinyltoluene, vinylanthracene; ethylvinylbenzene and vinylnaphthalene. Non-aromatic vinyl monomers, such as vinyl acetate, hydrolyzed vinyl acetate, vinyl chloride, acrylonitrile, (meth)acrylic acids and alkyl esters or amides of (meth)acrylic acids (such as methyl acrylate, methyl methacrylate, ethyl acrylate, butyl methacrylate, methyl methacrylamide and dimethylaminopropyl methacrylamide), may also be used in forming the seed particles of the present invention, in addition carboxylic-acid-containing low molecular weight polymers, those with molecular weights of less than about 10,000, are included within the scope of the present invention. The expression (meth)acrylic acid is intended to include methacrylic acid and acrylic acid; the expression is used similarly in, e.g., methyl (meth)acrylate, ethyl (meth)acrylate, and the like. Also useful are halogenated aromatic monomers, such as, for example, pentafluorophenyl methacrylate; and halogenated non-aromatic monomers, such as, for example, haloalky acrylates and methacrylates. Also useful for forming seed and pre-seed particles are monomers containing crosslinkable functional groups when subjected to the proper conditions such as UV irradiation. Such materials include QM-1442 also known as hydroxy-methacryloxy-propyl 2-benzoylbenzoate, available from the Rohm and Haas Co. Copolymers, such as those prepared from mixtures any of the aforementioned monomers, may also be prepared in forming the seed and pre-seed particles of the present invention.

Chain transfer agents such as, for example, mercaptans, polymercaptans, and polyhalogen compounds may optionally be added to the monomers in order to moderate molecular weight. Specific examples include alkyl mercaptans such as t-dodecyl mercaptans and hexanethiol; alcohols such as isopropanol, isobutanol, lauryl alcohol, and t-octyl alcohol; and halogenated compounds such as carbon tetrachloride, tetrachloroethylene, and trichlorbromoethane. For forming the seed particles, the amount of chain transfer agent required may be from about 5 percent to about 20 percent, although amounts above 20 percent may be required depending on the molecular weight desired. Typically the polymer chains have a molecular weight from below about 200,000, preferrably below about 100,000, and most preferred from about 200 to about 10,000. The lower molecular weights are preferred due to their inherent ability to swell.

The amount of seed in the seed emulsion is determined by the final desired concentration of seed in the mixture, and the desired final size of the liquid domains. The emulsion of seed particles may range up to about 50 percent seed particles by weight, and has no theoretical lower limit.

For forming droplets containing liquid crystal, an emulsion of liquid crystal material is used. The emulsion of liquid crystal material may be from 1 percent to 80 percent liquid crystal material by weight, preferably from 50 percent to 70 percent. The emulsion of liquid crystal material is combined with the aqueous emulsion of seed particles. The order of addition is not critical. The combination of the emulsion of liquid crystal material and the emulsion of seed particles generally will not significantly alter the weight percent of liquid crystal in the final emulsion.

In order to ensure that the liquid crystal material will swell the seed to form a liquid crystal domain, optionally a transport agent be used. The transport agent is also referred to as a co-solvent, and may be one or more materials selected from solvents and monomers. The co-solvent may be a mixture comprising one or more solvents and one or more monomers. A suitable co-solvent is preferably immiscible or slightly miscible with water, for example less than 5 percent soluble in water, and should act as a solvent for the liquid crystal. A mixture of co-solvents may be used.

Examples of solvents useful as transport materials in the method of the present invention are: $C_1$–$C_{12}$ alkyl esters such as ethyl acetate; halogenated $C_1$–$C_{12}$ alkanes such as methylene chloride; $C_1$–$C_{12}$ alkyl ethers such as ethyl ether; cyclic alkyl ethers such as 2,5-dimethyltetrahydrofuran and 2,2,5,5-tetramethyltetrahydrofuran; $C_1$–$C_{12}$ ketones such as 2-hexanone; and $C_1$–$C_{12}$ alcohols such as 1-pentanol. Ethyl acetate is the preferred solvent if a solvent is used as a transport agent.

Examples of monomers useful as transport materials in the method of the present invention are: $C_1$–$C_{20}$ acrylates and methacrylates; halogenated $C_1$–$C_{20}$ acrylates and methacrylates; aryl acrylates and methacrylates; halogenated aryl acrylates and methacrylates; hydroxy ethyl acrylate and methacrylate; hydroxypropyl methacrylate; hydroxypropyl acrylate; vinyl ethers; vinyl halides; and vinylidene halides.

If a monomer is used, the monomer composition will be determined by the desired composition of the optional polymeric shell, discussed herein below. Methyl methacrylate is the preferred monomer.

Alternatively, the transport material may be a macromolecular organic compound having a hydrophobic cavity. A "macromolecular organic compound having a hydrophobic cavity" is a polymeric molecule, typically cylindrical or approximately cylindrical, which typically has a hydrophilic exterior but has a hydrophobic interior. Such a compound may be used to transport hydrophobic substances in an aqueous environment.

Macromolecular organic compounds having a hydrophobic cavity, useful in method of the present invention, include cyclodextrin and derivatives thereof; cyclic oligosaccharides having a hydrophobic cavity, such as cycloinulohexose, cycloinuloheptose, and cycloinuloctose; calyxarenes; and cavitands.

If a transport agent is used and the transport agent is macromolecular, cyclodextrin is the preferred macromolecular organic compound to be used as a transport agent. The selection of cyclodextrin and derivatives thereof useful in the method of the present invention is determined by the solubility of the cyclodextrin and cyclodextrin derivatives in the aqueous medium and by the solubility of the species formed by the association of the transport agent and the LC. Suitable cyclodextrins useful in the method of the present invention include: a-cyclodextrin, b-cyclodextrin, and g-cyclodextrin. The preferred cyclodextrin derivative is methyl-substituted b-cyclodextrin.

The cyclic oligosaccharides having a hydrophobic cavity, such as cycloinulohexose, cycloinuloheptose, and cycloinuloctose, are described by Takai et al in *Journal of Organic Chemistry*, 59(11), 2967–2975 (1994).

The calyxarenes useful in the method of the present invention are described in U.S. Pat. No. 4,699,966.

The cavitands useful in the method of the present invention are described in Italian patent application No. 22522 A/89 and by Moran et al in *Journal of the American Chemical Society*, 184, 5826–28 (1982).

The amount of optional transport agent to be used is partly determined by the composition of the transport agent. If the transport agent is a cyclodextrin, the weight ratio of cyclodextrin to liquid crystal may range from about 1:1000 to about 10:100 and is typically from about 1:100 to about 5:100, more typically about 2:100. The lower limit is determined by such things as the desired rate of transport. The upper limit is determined by the required stability of the aqueous system. If the transport agent is a solvent or monomer, the ratio of transport agent to liquid crystal is less critical, and will depend upon the desired particle morphology. For example, if a solvent is used, the ratio between solvent and liquid crystal may be 10:1 or more. A monomer may be used as the transport agent. The amount of monomer used will be determined by the desired thickness of the shell, and by whether additional monomer will be used in forming the shell.

In addition to the liquid crystal material and the transport agent, there may also be present in the aqueous medium one or more monomers. The monomers may already be present if they have been used as a transport agent. Alternatively, one or more monomers may be added, for example, in the form of an aqueous emulsion. Monomers useful in this step include the ethylenically unsaturated monomers listed above. The total amount of monomer used may range from 5 weight percent to 95 weight percent, preferably 10 percent to 50 percent, and most preferably 15 to 35 percent based on the total weight of monomer and liquid crystal. The total amount of monomer within this range includes monomer used in forming the seed, monomer optionally used as a cosolvent, and monomer used in subsequent polymerizations discussed hereinbelow. The amount of monomer may be adjusted depending upon the efficiency of polymerization of the monomers, also called the conversion.

The one or more monomers may be polymerized in the presence of the liquid crystal materials and the transport agent. The monomers may be polymerized by aqueous suspension, emulsion, or dispersion polymerization. These methods are known in the art. Polymerization may be carried out as a batch, continuous, or semi-continuous reaction. Preferably, the polymerization is carried out as a batch reaction. The present invention is not limited to free-radical polymerization and that other forms of polymerization may also be used including but not limited to polycondensation. See for example, U.S. Pat. No. 3,577,515.

The polymer formed may be distributed uniformly throughout the particle, or it may be present as a discrete phase. The discrete phase may exist as one or more polymeric domains, or as one or more shells. As used herein, "shell" refers to a discrete, water-insoluble layer surrounding the liquid crystal material. One or more shells may be formed around the liquid crystal material.

Examples of monomers useful in the polymerization include styrene, a-methylstyrene, vinyltoluene, ethylvinylbenzene and vinylnaphthalene, vinyl anthracene, vinyl acetate, hydrolyzed vinyl acetate, vinyl halides, vinylidene halides, acryloyl and methacryloly functional silanes and siloxanes, vinyl silanes and siloxanes, halogenated aromatic monomers, acrylonitrile, acrylic acid, methacrylic acid, $C_1$–$C_{20}$ alkyl esters of acrylic acid, halogenated $C_1$–$C_{20}$ alkyl esters of acrylic acid, $C_1$–$C_{20}$ alkyl esters of methacrylic acid, halogenated $C_1$–$C_{20}$ alkyl esters of methacrylic acid, $C_1$–$C_{20}$ alkyl amides of acrylic acid, $C_1$–$C_{20}$ haloalkyl amides of acrylic acid and methacrylic acid, and $C_1$–$C_{20}$ alkyl amides of methacrylic acid. Suitable polycondensation monomers are provided in U.S. Pat. No. 3,577,515, see columns 7 and 8. Halogenated aromatic monomers include aromatic rings having halogen substituents directly attached to the ring, or present on alkyl groups attached to the ring, such as for example a trifluoromethyl group. Examples of halogenated aromatic monomers include pentaflurophenyl acrylate and pentafluorophenyl methacrylate.

The polymerization of the one or monomers may be used to form a polymeric shell around the liquid crystal material. Polymer shells may be formed around the liquid crystal material with monomers that may contain one or more functional groups which may be converted to an ionic moiety. Alternatively, polymer shells may be formed around the liquid crystal material with monomers that do not contain ionic moieties.

Monomers containing functional groups which may be converted to an ionic moiety include hydrolyzable esters and anhydrides, monomers containing carboxylic acid moieties and monomers containing amine moieties. Examples of monomers containing carboxylic acid moieties include acrylic acid, methacrylic acid, (meth)acryloxypropionic acid, itaconic acid, citraconic acid, crotonic acid, maleic acid, maleic anhydride, fumaric acid, monomethyl maleate, monomethyl fumarate, monomethyl itaconic acid, and mixtures of methacrylic and acrylic acid. The use of carboxylic acid containing low molecular weight oligomers, those with molecular weights of less than about 10,000 molecular weight, are included within the scope of the present invention. Examples of monomers containing amine moieties include 2-aminoethyl methacrylate, N-methacryloxypiperidine, dimethylaminoethyl methacrylate, vinyl pyridine, 2-(dimethylamino)ethyl (meth)acrylate, 2-(tert-butylamino)ethyl (meth)acrylate, 3-(dimethylamino)propyl (meth)acrylamide, 2-(diethylamino)ethyl (meth)acrylate and 2-(dimethylamino)ethyl (meth)acrylamide. Preferred are monomers having acidic moieties and having a pKa of at least 3, such as methacrylic acid and mixtures of methacrylic acid and acrylic acid. Most preferred is methacrylic acid.

Relative to the total monomers present, the amount of monomer conversion to ionic moieties preferably constitutes from zero up to about 10 percent by weight of the total monomers, more preferably 1 percent to 7 percent, and most preferably 2 percent to 5 percent. However, the amount of monomer containing convertible functional groups is not limited to 10 percent, because the amount of conversion may be less than 100 percent of the available convertible functional groups.

Other monomers, not having functional groups convertible to an ionic moiety but which are useful in forming the polymeric shell according to the method of the present invention, and may be present in the aqueous medium, include hydroxy and di-hydroxy alkyl acrylates and methacrylates, such as for example hydroxyethyl acrylate, hydroxyethyl methacrylate, hydroxypropyl methacrylate, and hydroxypropyl acrylate. The amount of these monomers to be used is preferably 1 percent to 30 percent, and most preferably 10 percent to 20 percent by weight, based on the total weight of all monomers.

The solubility of the liquid crystal material in the polymer to be formed may influence the need for the use of a monomer with functional groups convertible to an ionic moiety in order to form a discrete shell of uniform thickness.

Also useful are monomers which have functional groups which provide stabilization against ultraviolet (UV) radiation. Examples of these monomer include polymerizable hindered amines. Another type of UV stabilizing monomer is 4-methacryloxy-2-hydroxybenzophenone.

The functional groups may be converted to ionic moieties, for example, by acid-base reaction, or hydrolysis of said functional groups. For example, to carry out an acid base reaction, a base may be added when acid functional monomers are used, and an acid may be added when basic functional monomers have been used. The amount of acid or base is dependent upon the functional group and upon the degree of ionization desired. Bases useful include amines such as ammonia, and organic amines such as methyl amine, triethylamine, piperidine, pyridine, mono, di-, and tri- alkyl amines, aryl amines, aniline, aminonaphthalene, other aryl amines; and hydroxides such as sodium hydroxide. Acids useful include $C_1$–$C_{12}$ aliphatic and aromatic monocarboxylic acids, dicarboxylic acids, and corresponding anhydrides and mixtures thereof. Specific examples include benzoic acid, m-toluic acid, p-chlorobenzoic acid, o-acetoxybenzoic acid, azelaic acid, sebacic acid, octanoic acid, cyclohexanecarboxylic acid, lauric acid, and monobutyl phthalate. Inorganic acids such as hydrochloric acid, sulfuric acid, and phosphoric acid may also be used. Also useful are sulfonic acids such as para-toluene sulfonic acid and methane sulfonic acid, and phosphonic acids. Acetic acid is preferred.

For example, typically to achieve substantially complete ionization when a monomer containing a monocarboxylic acid function is used, ammonia may be added. The amount of ammonia added is at least one molar equivalent based on monocarboxylic acid functional monomer, and preferably about 1.5 molar equivalents. Typically, to achieve complete ionization when a monomer containing an amine functional group is used, acetic acid may be added. The amount of acetic acid added is at least one molar equivalent, and preferably about 1.5 molar equivalents.

The conversion of the functional groups to ionic moieties is carried out as a final step in the process for forming the shell. The entire process for making the liquid crystal domains and the shell may be summarized as follows. A solution of liquid crystal, initiator, and monomer is emulsified and added to an emulsion of the seed. After the seed is swelled by the liquid crystal, monomer and initiator, and has formed uniformly sized liquid crystal domains, then the mixture may be heated to the polymerization temperature for the monomer/initiator combination. Alternatively, heating and swelling may be carried out simultaneously. When polymerization is complete, the acid or base is added.

The polymeric shell may be crosslinked subsequent to the polymerization to form the shell polymer, preferably subsequent to the conversion of functional groups to ionic moieties. Crosslinking may be accomplished by the reaction of residual double bonds or functional groups, with or without the addition of a catalyst or other crosslinking agents. Crosslinking agents described above for use in crosslinking the pre-seed polymer are also useful in crosslinking the polymeric shell. In particular, if monomers such as acetyl acetoxy ethyl methacrylate were used in forming the polymeric shell, the subsequent reaction with formaldehyde or other aldehydes can serve to crosslink the polymeric shell. Other methods of crosslinking include the addition of difunctional molecules which can serve as crosslinking agents such as for example aziridine, carbodiimide, and diisocyanates. Also useful are metal salt methods of crosslinking known to those skilled in the art. Of further utility are monomers containing moieties useful as photoinitiators. Polymer chains containing these moieties can be subjected to photocuring methods known in the art to achieve free radical crosslinking.

For example, if an epoxy-containing monomer was used in forming the shell polymer, a base may be utilized to effect crosslinking. The base may be present as a result of the shell formation, or may be added. The amount of base present, either in free or complexed form after shell formation, will generally be sufficient to effect crosslinking. However, additional base may be added to achieve a greater degree of crosslinking. Typically, a full molar equivalent is not required. The amount of base required may be referred to as a "catalytic amount", meaning that only an amount of base required to facilitate the reaction is needed since the base is not consumed in the reaction.

Crosslinking by means of residual double bonds may require inducing a reaction by, for example, UV irradiation, optionally in the presence of a photsensitizing agent, or addition of free-radical initiator. Other crosslinking agents relying on free-radical reactions, which may be, for example, thermally initiated, include polyfunctional acrylates and methacrylates. Specific examples are allyl methacrylate and 1,1,1-trimethylolpropane tri(meth)acrylate. When one of the monomers is itself a photoinitiator, free radicals can be created on previously inert polymer chains, leading to reaction with other similarly activated chains to give crosslinking.

Formation of more than one shell may be accomplished by sequential polymerization in more than one stage. It is preferred that the hydrophilicity of the polymers in each stage not be the same after neutralization. Hydrophilicity refers to the affinity of the polymers for the aqueous phase. Polymers of sufficiently different hydrophilicity will form, upon neutralization, discrete adjacent shells or interpenetrating shells representing a gradient of composition. The neutralization of the polymer stages is a preferred embodiment and is not required. The difference in hydrophilicity may be accomplished by using different monomers in each stage, or by using the same monomers but in different ratios.

Formation of more than one shell may also be accomplished by simultaneous polymerization of monomers having reactivities sufficiently different that they would not be likely to react together to form a random copolymer.

Optionally, the shell may be a polymer having film forming capabilities. Polymers having film forming capabilities are characterized by their ability to flow, and form a film under ambient conditions or upon the application of heat. Examples of polymers having film forming capabilities include: polyacrylates and polymethacrylates; and other homopolymers and copolymers formed from acrylates, methacrylates, urethane, acrylonitrile, vinylidene chloride, and styrene.

If the one or more shells have sufficient flexibility, the particles may be compressed in order to obtain packing without coalescing of particles. This allows for denser packing of particles and resulting higher loading of liquid crystal in a film. Increased loading can provide faster switching rates, particularly faster switching to the "off" state, and more efficient light scattering, if light scattering is desired for a particular application.

The ability to pack the particles also allows for the formation of polyhedral geometries, characterized by flat surfaces, sharply angular edges and sharp vertices, in contrast to spherical or ellipsoidal particles. The particles acquire polyhedral shapes due to being closely packed and compressed. Interstices between individual particles are substantially filled when the particles have polyhedral geometries. Polyhedral geometries allow for greater control of light scattering and of alignment of the liquid crystal molecules both in the electrically "off" condition and during switching to the "off" state. The polyhedral geometries are also characterized by uniform polymer matrix thickness between domains of liquid crystalline material, which also provides more efficient and controlled light scattering. Filling of the interstices and consequent reduction in the amount of matrix polymer may improve switching properties, including reducing the switching voltage and increasing the switching rate.

Optionally, additional monomer, or mixtures thereof, may be added and polymerized following the formation of the one or more shells. The additional monomer is polymerized on or in the particle including the one or more shells. This forms another external polymeric shell, useful for controlling such properties as: the structural integrity and flexibility of the PELC particle; anchoring forces at the interface between liquid crystal and polymer wall; film formation; and adhesion. Initiator may be added prior to, concurrently with, or subsequent to, the addition of the additional monomer. It is preferred that the composition of the additional monomers be chosen so that the additional monomers, when polymerized, form a layer adjacent to the existing shell(s) and bounded on its other surface by either liquid crystal or water.

The polymeric shell may optionally be functionalized following formation. For example, if functional groups exist on the interior surface of the innermost shell or the exterior surface of the outermost shell, derivatives may be formed at the desired surface. Examples of reactions by which functionalization may be accomplished include esterification, salt formation, complexation, polymerization, and substitution reactions. Said reactions may be carried out utilizing methods known to those skilled in the art. Functionalization of polymers is discussed, for example, in U.S. Pat. No. 4,283,499.

An optional additional step in the method of the present invention is the removal of the transport agent. The manner in which removal is carried out depends upon the composition of the transport agent.

If a macromolecular organic compound having a hydrophobic cavity, such as for example a beta cyclodextrin or methylated beta cyclodextrin, has been used as the transport agent, it may be removed from the particle by adding a decomplexing agent. A decomplexing agent is a material having an affinity for the macromolecular compound having a hydrophobic cavity. The decomplexing agent may be added before polymerization or after polymerization of any monomers present. If a monomer has been polymerized by emulsion polymerization in the presence of the macromolecular compound and the liquid crystal material, decomplexing may occur automatically before the polymer is formed and further decomplexing is generally not necessary.

Once decomplexation has been carried out, the macromolecular organic compound may still remain in the aqueous phase. Optionally, it may be removed from the aqueous phase by, for example, diafiltration. The particles may also be separated from the aqueous phase by centrifugation or settling, followed by decantation.

Suitable decomplexing agents include conventional surface active agents, such as, for example, nonionic, anionic and cationic surfactants. Other suitable decomplexing agents include organic solvents such as, for example, ethanol. The amount of decomplexing agent used is preferably 1 to 10 moles of decomplexing agent per mole of macromolecular organic compound having a hydrophobic cavity, to achieve complete decomplexation.

If an organic compound, including monomers and solvents, is used as the transport agent, it may also be removed. The organic compound is preferably, but not necessarily removed before polymerization. The organic compound may be removed by evaporation.

If a component of the liquid domain contained within the PELC, further comprises a solid desolved in a liquid, the liquid may be removed by evaporative or other means from the PELC, leaving a solid surrounded by the polymer shell with or without additional void space.

The PELC particles may be isolated in powder form after removal of aqueous phase. Isolated particles may be redispersed in aqueous or nonaqueous liquids. Following isolation, it may be desired, for example, to form a mixture of particles having two or more sizes. A mixture may be formed by combining isolated particles or, preferably, by combining dispersions of particles. Alternatively, a mixture of particle sizes may be obtained by carrying out the primary swelling described hereinabove, using seed particles having different particle sizes. Upon forming a film comprising a mixture of particles having two or more sizes, allows for stepwise switching and greater control of film opacity.

Liquid crystal-containing particles formed according to the present invention may be used to form films. A film may be formed by incorporating a polymer into an emulsion or suspension of particles, or into a water-soluble polymer. Polymers useful in forming films with the particles of the present invention include film-forming latex polymers and water soluble polymers. Film-forming latex polymers and water soluble polymers may be used alone or in combination with one another. Examples of film-forming latex polymers useful in forming films include polyethylene, polyurethane, polysiloxane, polybutadiene, copolymers of butadiene and styrene; homopolymers and copolymers of: $C_1$–$C_{20}$ acrylates and methacrylates; halogenated $C_1$–$C_{20}$ acrylates and methacrylates; aryl acrylates and methacrylates; hydroxy ethyl acrylate and methacrylate; hydroxypropyl methacrylate; hydroxypropyl acrylate; vinyl ethers; vinyl halides; vinylidene halides, fluorocarbons, hydroxy-methacryloxypropyl 2-benzoylbenzoate and mixtures thereof. Examples of water soluble polymers include polyvinyl alcohol, poly-N-vinyl pyrrolidone, carboxymethylcellulose, gelatin, hydroxyethylcellulose, partially saponified polyvinyl acetate, polyacrylamide, polyethylene oxide, polyethyleneimine, polyvinylalkyl ethers, polyacrylic acid copolymers of polyacrylic acid, polyethylene glycol, sodium polystrenesulfonate. Preferred water soluble polymers are polyvinyl alcohol and poly-N-vinyl pyrrolidone.

Several techniques are useful in forming films from the particles formed by the method of the present invention. These techniques are known in the art, and include curing with ultraviolet (UV) radiation. When UV curing is used, photosensitizing agents are typically employed.

A film may be formed from a dispersion or suspension of the particles. The dispersion or suspension may contain, in addition to the particles, one or more of the following: water soluble polymer, latex film-forming polymers, additional liquid crystal, and additives such as crosslinking agents. Cross-linking may be accomplished by the methods described hereinabove, and using the crosslinking agents described hereinabove. The dispersion or suspension may be spread on an indium tin oxide (ITO) or other suitable electrode coated substrate surface. Two ITO surfaces may be coated and forced together, preferably under vacuum, to compress the particles and form a film. Coating of the ITO surfaces may be accomplished by methods known in the art, such as spin-coating and Doctor blade application.

The liquid crystal particles formed by the method of the present invention may have polyhedral shapes in films, which reduces or eliminates interstitial space between particles in the film and provides for improved light scattering in the off state of a PDLC device, as discussed hereinabove. One method for obtaining polyhedral shapes is by heating, then cooling, a film formed from the particles. Optionally, pressure may be applied, and under some conditions, heating may not be necessary. It is believed that the heating allows the particles to swell, and brings the polymeric shells of the particles into contact, said contact remaining after the film is cooled. This forms a polymeric matrix around the polyhedral shaped particles. A crosslinking agent may be added before, during, or after the heating process, to effect crosslinking. Any of the crosslinking methods described herein for crosslinking the polymer shell may be used in crosslinking in a film. There may also be present water soluble polymer, latex film-forming polymers, or additional liquid crystal, as described hereinabove. If these additional components are present in excessive quantities, shapes other than polyhedral shapes, such as spheres or distorted spheres, may result. Polyhedral shapes may be obtained without heating when the particles have a shell which is sufficiently pliable under ambient conditions.

Alternatively, a film may be formed from the particles in powder form. To obtain a powder, a dispersion or suspension is dried to leave the particles. Two plates formed of, for example, glass or plastic, are each coated on one surface with a conductive material. The preferred conductive material is ITO. The powder is then placed on one or both coated surfaces. A vacuum is applied as the plates are brought into contact with the powder between them. Mechanical pressure may then be applied. Sufficient mechanical pressure may be applied to obtain the polyhedral shapes discussed hereinabove. The shape of the particles may be observed under a microscope while pressure is applied.

In another embodiment, a film may be formed from liquid crystal droplets obtained by the method of the present invention. These liquid crystal droplets may contain higher levels of seed material although the droplets preferably contain from about 0.1 percent to about 15 percent seed material. To form a film from the liquid crystal droplets, the droplets are mixed with a film forming latex emulsion or a water soluble polymer, as discussed hereinabove.

Optionally, organic dyes may be incorporated into the liquid crystal domains of the present invention. A dye may be added, for example, by dissolving the dye in the liquid crystal so that the dye will be transported along with the liquid crystal. Alternatively, the dye may be added separately or may be dissolved in a monomer or solvent. Examples of dyes include pleochroic dyes such as, for example, Oil Blue N, Sudan black B, Sudan 3, Sudan 2, indophenol blue, D-37 (E. Merck), D-43, D-85; and non-pleochroic dyes, such as, for example, water soluble dyes, food coloring dyes, and cloth or fabric dyes. Specific examples of non-pleochroic dyes include FD&C dyes and other dyes listed in U.S. Pat. No. 4,662,720. Typically, a dye is incorporated at a level of 0.5 percent to 6 percent by weight of the crystal material.

Polymer particles of the present invention containing liquid crystal domains, or containing another organic liquid as described herein, may be combined with liquid crystal material, preferably the same liquid crystal which is contained within the particles, to form a mixture. There may be present in the liquid crystal additives such as dispersants or thickeners. The mixture may then be used to form a film or fill a display device as described above.

Because the method of the present invention produces particles of uniform size, the method may be used to form a mixture of particles of selected sizes. This may be done, for example, by using the method to produce separate batches of particles having desired particle sizes, and combining the differently sized particles together in the desired proportions. This provides a mixture of discrete particle sizes, and allows for the exclusion of particular sizes. One application of the ability to form a mixture of particles having selected sizes is in forming a film which has several switching voltages that increase in discrete steps rather than continuously. This capability is useful in applications such as active matrix display or with enhanced grayscale. Particles of the same or different sizes, and having different seed or shell compositions, or swelled with different materials, may be combined.

BRIEF DESCRIPTION OF THE DRAWINGS

FIG. 9. Percent transmission versus voltage curve for the film of Example 11.

Figure 1:
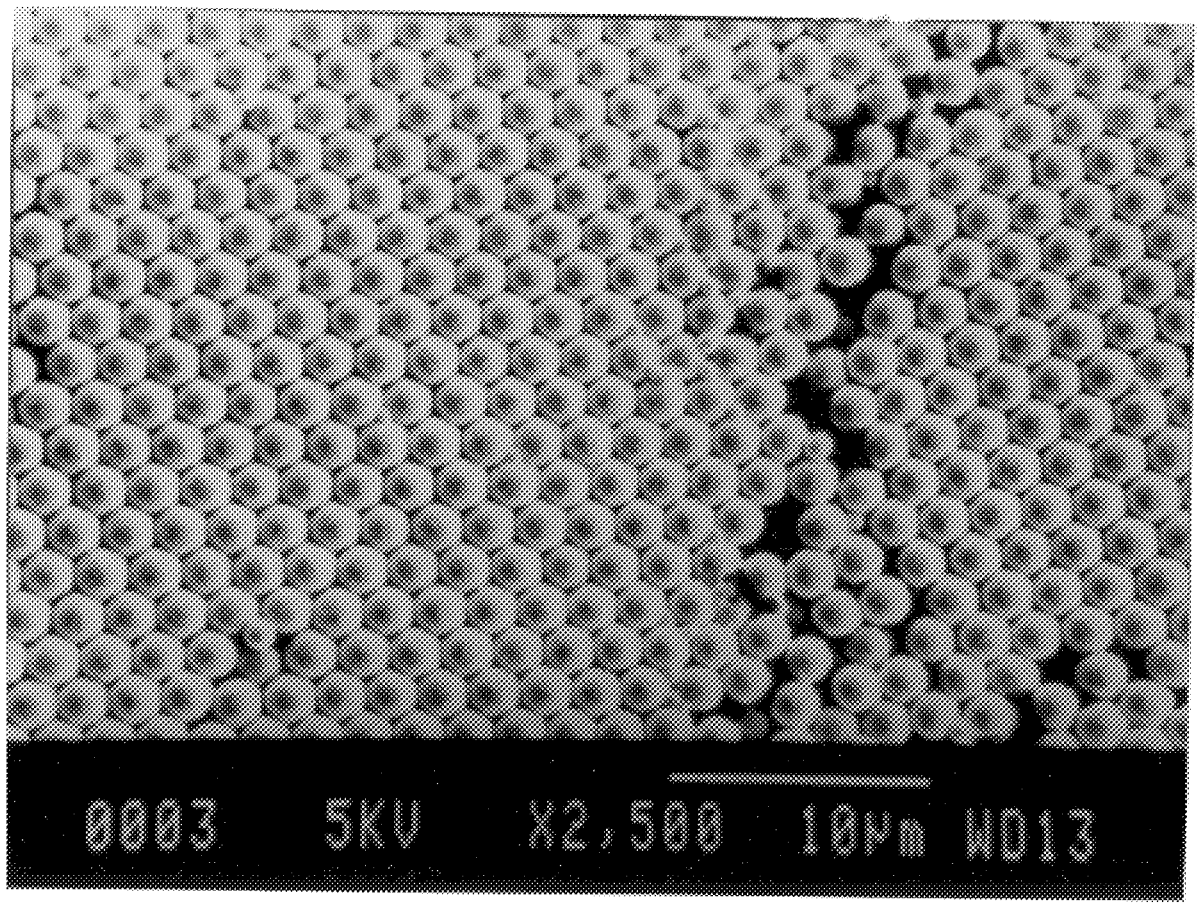
FIG. 1. Scanning electron microscopy (SEM) photograph displaying the liquid crystal filled polymer particles prepared in Example 3. The particles are magnified 2,500×. The particles have a polydispersity of 1.005.

The following abbreviations are used in the examples and specifications.

LC Liquid crystal
E7 Merck liquid crystal mixture
ITO Indium Tin Oxide
TL205 Merck liquid crystal mixture (fluorinated type)
CD Methyl beta-cyclodextrin
BA Butyl acrylate
Bd Butadiene
MMA Methyl methacrylate
MAA Methacrylic acid
EA Ethyl acrylate
HEMA Hydroxyethyl methacrylate
Sty Styrene
NaDDBS Sodium dodecylbenzene sulfonate
DOSS Dioctyl sulfosuccinate
t-BPO tert-Butyl peroctoate
EtOAc Ethyl acetate
EtOH Ethyl alcohol
MDC Methylene chloride ($CH_2Cl_2$)
SEM Scanning electron microscope or scanning electron microscopy
PVOH Poly(vinyl alcohol)
DI deionized
rms root mean square All units are measured in parts by weight unless otherwise designated.

The following examples are provided as an illustration of the present invention.

EXAMPLE 1

Preparation of Droplets Containing Liquid Crystal

In a Waring® blender 100 parts of Merck E7 liquid crystal, 900 parts of methylene chloride, 33 parts of sodium dodecylbenzene sulfonate (NaDDBS) (10% solution in water), 335 parts of deionized water, and 39 part s of methyl beta-cyclodextrin (50.8% solution in water; available from Wacker Company), were emulsified at very high shear for 5 minutes. Optical microscopy at 500×displayed emulsified LC droplets having diameters in the range of approximately 1 to 2 microns.

To the emulsified LC mixture were added 28 parts of an emulsion latex (5.00% by weight; BA/styrene/hexanethiol, 82/18/19; weight average molecular weight 2000; 0.562 micron particle size). The mixture was then subjected to mild agitation for 16 hours at room temperature. The combined emulsion was then viewed under an optical microscope at 500×. Uniformly sized particles of 4.5 microns diameter were observed.

The emulsion was then heated to remove the methylene chloride. Microscopic examination at 500× revealed smaller particle droplets which were essentially pure LC as evidenced by the presence of a 'Maltese cross' pattern on the droplets under polarized light. The presence of a Maltese cross pattern is known in the art to indicate the presence of liquid crystal. The particle size was 2.1 microns.

Formation of Films

Polymer dispersed liquid crystal films of the emulsified liquid crystal droplets were prepared after mixing the sample into a suitable latex binder.

In one process to form a film, 166 parts of an emulsion binder latex (50/50 by weight BA/Sty; 30% polymer in water) was added to the sample and a film was prepared by evaporation of the water at room temperature. Microscopic examination of the dry film at 500× revealed LC particle droplets within the polymer matrix. The LC droplet particles were uniformly sized and spherical, and exhibit a Maltese cross pattern under polarized light.

Another film was obtained by mixing the LC emulsion with 166 parts of a butadiene/styrene copolymer emulsion (70/30 by weight polybutadiene/polystyrene, 30% polymer in water).

EXAMPLE 2

Preparation of Liquid Crystal Filled Polymer Particles

In a Waring® blender 333 parts of Merck E7 liquid crystal, 167 parts of monomer solution (154 parts MMA, 8.3 parts EA, 4.2 parts MAA, and 5.8 parts t-BPO), 2.3 parts of DOSS (75% solution in water/EtOH), 198 parts of deionized water, and 19.9 parts of methyl beta-cyclodextrin (50.8% solution in water), were emulsified at very high shear for 5 minutes. Optical microscopy at 500× revealed emulsified LC droplets having diameters within the range of approximately 1 to 2 microns.

To the emulsified LC mixture, 14.4 parts of an emulsion latex were added (5.00% by weight; BA/styrene/hexanethiol, 82/18/19 as used in Example 1). The mixture was then subjected to mild agitation for 24 hours at room temperature. A sample was then viewed under the microscope at 500×. Uniformly sized particles of 4.5 microns were observed.

The mixture, which is 30% water, was diluted to 80% water by weight. The reaction mixture was added to a sealed pressure tube and subjected to mild agitation in a hot water bath at 85° C. for 1 hour. Ammonia solution, to result in 1.7 molar equivalents based on the MMA, was added by syringe to the mixture at 85° C. After a 30 minute hold the mixture was cooled and sampled for optical microscopy. The mixture was then dried and a sample of the dried material was examined by scanning electron microscopy (SEM). Uniformly sized particles of 4.5 microns diameter were observed.

EXAMPLE 3

Preparation of Liqiud Crystal Filled Polymer Particles

In a Waring® blender 333 parts of Merck E7 liquid crystal, 167 parts of monomer solution (154 parts MMA, 8.3 parts EA, 4.2 parts MAA, and 5.8 parts of t-BPO), 2.3 parts of DOSS (75% solution in water/EtOH), 98.9 parts of deionized water, and 19.9 parts of methyl beta-cyclodextrin (50.8% solution in water), Wacker Company, were emulsified at very high shear for 5 minutes. Optical microscopy at 500× revealed emulsified LC droplets with diameters within the range of approximately 1 to 2 microns.

To the emulsified LC mixture, 113.5 parts of an emulsion latex (10.00% by weight, BA/sty/hexanethiol, 82/18/19 as used in Example 1). The emulsion mixture was then subjected to mild agitation for 24 hours at room temperature. The mixture was then viewed under the microscope at 500×. Uniformly sized particles of 2 microns were observed.

The above mixture, which was 30% water, was diluted to 80% water by weight. The reaction mixture was added to a sealed pressure tube and subjected to mild agitation in a hot water bath at 85° C. for 1 hour and then an additional 1 hour at 95° C. Ammonia solution, to produce 1.7 molar equivalents based on the MAA was added by syringe to the mixture at 85° C. After a 30 minute hold the mixture was cooled and sampled for optical microscopy. The sample was then dried and examined by SEM as depicted in FIG. 1. Uniformly sized particles of 2.0 microns diameter were observed. The polydispersity was 1.005.

EXAMPLE 4

Preparation of Liquid Crystal Filled Polymer Particles

In a Waring® blender, 167 parts of TL205 liquid crystal (E-Merck), 333 parts of ethyl acetate, 2.3 parts of DOSS (75% solution in water/EtOH), 98.9 parts of deionized water, and 19.9 parts of methyl beta-cyclodextrin (50.8% by weight) solution in water), were emulsified at very high shear for 5 minutes. Optical microscopy at 500× revealed emulsified LC droplets having diameters within the range of approximately 1 to 2 microns.

To the emulsified LC mixture, 113.5 parts of an emulsion latex (10.00% by weight, 0.562 micron particle size; BA/sty/hexanethiol, 82/18/19). The mixture was then subjected to mild agitation for 30 minutes at 85° C. A sample was then viewed under the microscope at 500×. Uniformly sized particles were observed. The ethyl acetate was removed by heating the sample and bubbling nitrogen through the mixture.

Formation of Polymer Shell 83.33 parts of monomer solution (154 parts MMA, 8.3 parts EA, 4.2 parts MAA and 5.8 parts of t-BPO) were emulsified with 0.38 parts of DOSS (75% solution in water/EtOH), and 83 parts of deionized water. This emulsion was added to the LC emulsion from above. Within 5 minutes the monomer was incorporated into the LC droplets, as evidenced by the disppearance of the monomer emulsion. (The monomer emulsion had droplets having a wide distribution of sizes, whereas the LC droplets were uniformly sized).

Figure 2:
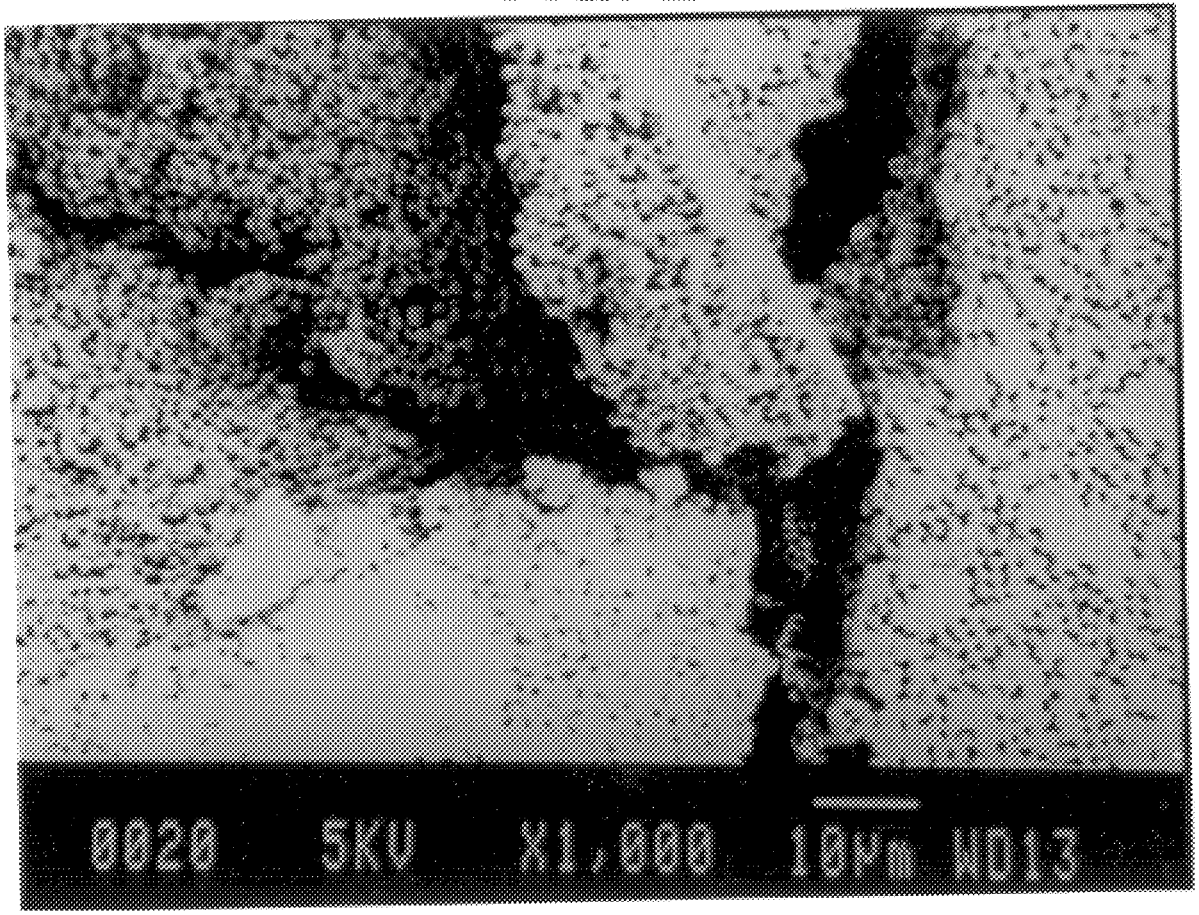
FIG. 2. SEM photograph displaying the liquid crystal filled polymer particles prepared in Example 4. Magnification is 1,000×. The particles have a polydispersity of 1.031.

The above mixture was diluted with water to 80% water by weight. The mixture was added to a sealed pressure tube and subjected to mild agitation in a hot water bath at 85° C. for 1 hour and then an additional 1 hour at 95° C. Ammonia solution, to produce 1.7 molar equivalents based on the MAA, was added by syringe to the mixture at 85° C. After a 30 minute hold the mixture was cooled and dried and examined by SEM as depicted in FIG. 2. Uniformly sized particles having diameters of 1.5 microns were observed. Polydispersity was 1.031.

EXAMPLE 5

Preparation of Liquid Crystal Filled Polymer Particles

In a Waring® blender 167 parts of E7 liquid crystal (E-Merck), 333 parts of ethyl acetate, 2.3 parts of DOSS, (75% solution in water/EtOH), 385 parts of deionized water, were emulsified at very high shear for 5 minutes. Optical microscopy at 500× revealed emulsified LC droplets having diameters within the range of approximately 1 to 2 microns. 113.4 parts of an emulsion latex (10.00% by weight, BA/sty/hexanthiol, 82/18/19 as used in Example 1) were added to the emulsified LC mixture. The mixture was then subjected to mild agitation for 60 minutes at 85 ° C. The mixture was then viewed under the microscope at 500×. Uniformly sized particles having diameters of 2 microns were observed.

Formation of Polymer Shell

The ethyl acetate was removed by heating the sample 75° C. and bubbling nitrogen through the sample. 83.33 parts of monomer solution (154 parts MMA, 8.3 parts EA, 4.2 parts MAA, and 5.8 parts of t-BPO) were emulsified with 0.38 parts of DOSS (75% solution in water/EtOH), and 83 parts of deionized water. This mixture was added to the LC emulsion from above. Within several 15 minutes the monomer was incorporated into the LC droplets.

The above mixture was diluted to 80% water by weight. The mixture was then added to a sealed pressure tube and subjected to mild agitation in a hot water bath at 85° C. for 1 hour and then an additional 1 hour at 95 C. Ammonia solution, to produce 1.7 molar equivalents based on the MAA, was added by syringe to the mixture at 85° C. After a 30 minute hold the sample was cooled and dried. A sample was dried and examined by SEM. Uniformly sized particles having diameters of 1.5 microns were observed. Polydispersity was 1.004.

EXAMPLE 6

Preparation of Liquid Crystal Filled Polymer Particles and a Switchable PDLC Film a) Preparation of Uniformly Sized Droplets of Liquid Crystal To a Waring® blender were added 167 parts of TL205 liquid crystal (E-Merck), 333 parts of ethyl acetate, 2.3 parts of DOSS (75% solution in water/EtOH), 98.9 parts of DI water, and 19.9 parts of methyl beta-cyclodextrin (50.8% by weight solution in water), Wacker Company, and emulsified at very high shear for 5 minutes. Optical microscopy at 500× showed emulsified LC droplets in the range of 1 to 2 microns, with the majority of approximately 1 to 2 microns. To the emulsified LC mixture 113.5 parts of an emulsion latex (10.00% by weight, 0.562 micron particle size; BA/sty/hexanethiol, 82/18/19), were added. The mixture was then subjected to mild agitation for 60 minutes at 85° C. Uniformly sized particles were observed under an optical microscope at 500×. The ethyl acetate was removed by heating and bubbling nitrogen through the mixture.

b) Preparation of Polymer Shell 83.33 parts of monomer solution (88.09 parts MMA, 57.61 parts styrene, 16.65 parts HEMA, 4.16 parts MAA, and 5.8 parts of t-BPO) were emulsified with 0.38 parts of DOSS (75% solution in water/EtOH), and 83 parts of DI Water. This mixture was added to the liquid crystal emulsion from above. In 15 minutes the monomer was incorporated into the LC droplets.

The emulsion mixture was diluted to 80% water by weight. The mixture was then added to a sealed pressure tube and subjected to mild agitation in a hot water bath at 85° C. for 1 hour and then an additional 1 hour at 95° C. The reaction tube was cooled to 70° C. and ammonia solution, (to produce 1.7 molar equivalents of ammonia based on the MAA), was added via a syringe to the mixture. After a 30 minute hold the emulsion was cooled. The emulsion was then dried and examined by SEM microscopy. The particle size was 1.5 microns. The polymer shell had a theoretical refractive index of 1.527, based on its composition, and was designed to match the ordinary refractive index of the liquid crystals.

Theoretical refractive index for a copolymer is the weighted average refractive index for each monomer component, and is calculated by:

$$h = x_1 R_1 + x_2 R_2 + x_3 R_3 + \ldots + x_i R_i$$

where $x_1$ is the weight fraction of the homopolymer of monomer 1, and $R_1$ is the refractive index of the homopolymer of monomer 1, etc., and i is the total number of monomers.

c) PDLC Film Formation

The particle emulsion from step (b) was hand blended at 25° C. with a 10% (based on weight) aqueous solution of poly vinyl alcohol (PVOH) (Air Products Co., Product code 321). The weight ratio of dried particles to dry PVOH was calculated to be 1:1. The refractive index of a dry film of this PVOH is about 1.52. The mixture was applied to an ITO-coated glass substrate (Donnelly Applied Films Co.) using a Doctor blade. The film was dried overnight in a vacuum oven at 25° C., to form a PVOH/particle film. The thickness of the dried film was 50 microns. A 20 micron film of NOA65 optical adhesive (Norland Optical Co.) was applied to the surface of the PVOH/particle film followed by a top piece of ITO coated glass. The adhesive was cured using ultraviolet radiation of 365 nm wavelength and an intensity of 10 mW/cm² for 5 minutes. A voltage was applied to the film using a variac to control the applied voltage. The film switched from opaque to clear at about 70 volts indicating a switching voltage of about 1 volt per micron of sample thickness.

EXAMPLE 7

SEM Examination of Fractured Film

Figure 3:
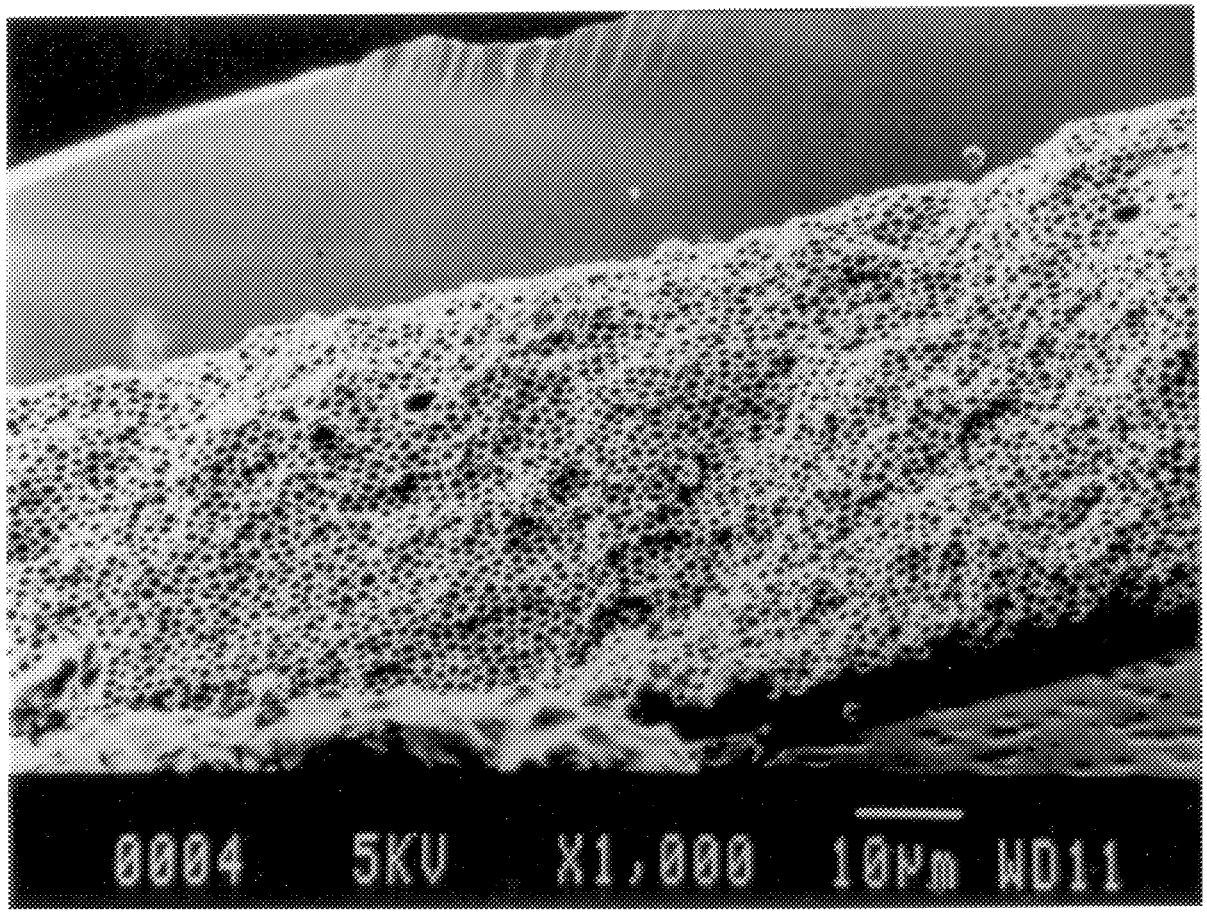
FIG. 3. SEM photogrash of the film prepared in Example 7, which has been fractured and dipped in hexane to remove the liquid crystal from the particles. Magnification is 1,000×.
Figure 4:
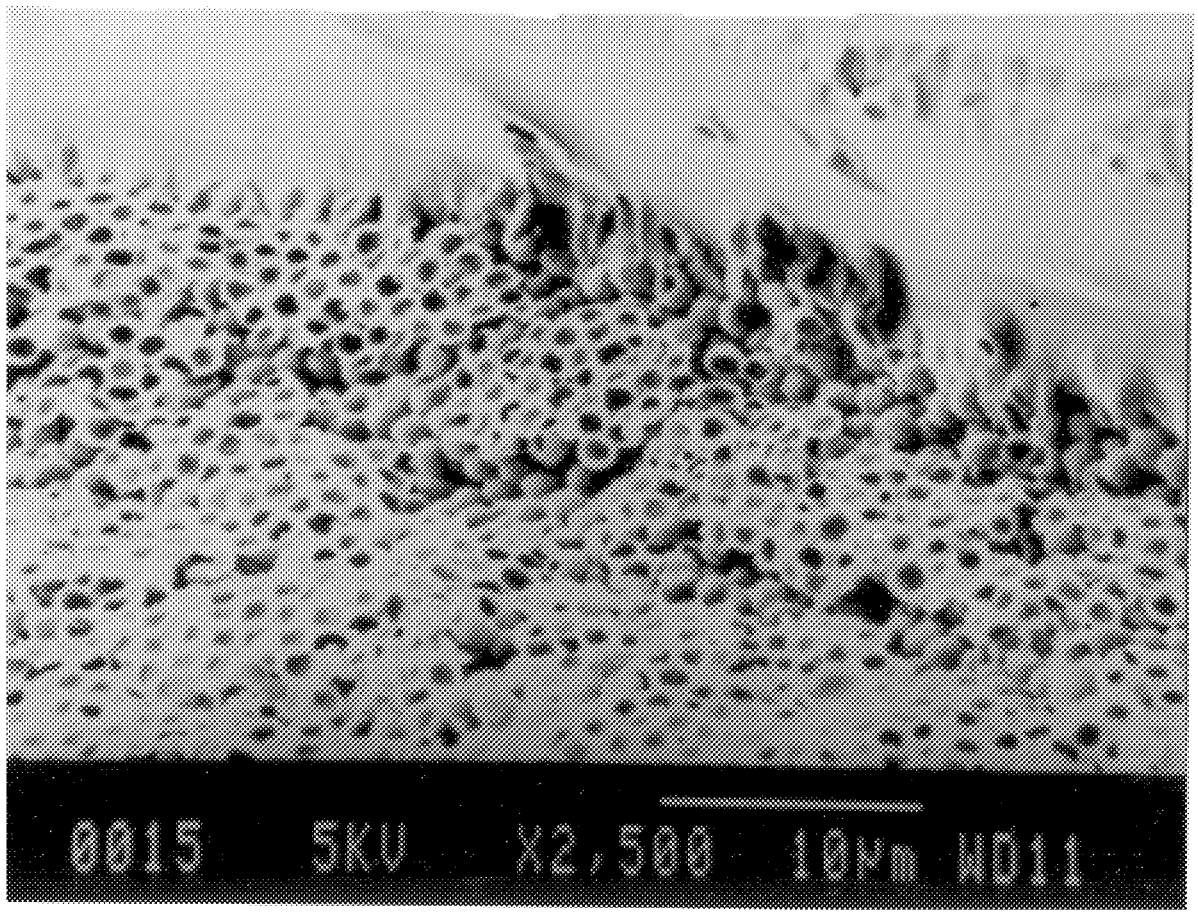
FIG. 4. SEM photograph of the film prepared in Example 7, which has been fractured and dipped in hexane to remove the liquid crystal from the articles and then dipped in water, in order to observe the polymer shell as distinct from the film matrix. Magnification is 2,500×.

The film formed in Example 6 was fractured in liquid nitrogen for SEM examination of a cross-section of the film. The fractured specimen was dipped into hexane to extract liquid crystal from the broken particles. SEM photographs revealed uniformly sized cavities previously occupied by the liquid crystal as depicted in FIG. 3. The distinction between the shell polymer and PVOH matrix can be observed by exposing the fractured film briefly to water. SEM photos then exhibit distinct particle shell in the areas where the water has etched away the PVOH film as depicted in FIG. 4.

EXAMPLE 8

Preparation of Liquid Crystal Filled Polymer Particles and a Switchable PDLC Characterized as Having High Hystersis a) Primary Swelling 167 parts of TL205 liquid crystal (E-Merck), 333 parts of ethyl acetate, 2.3 parts of DOSS (75% solution in water/EtOH), 98.9 parts of DI water, and 19.9 parts of methyl beta-cyclodextrin (50.8% solution in water), Wacker Company, were added to a Waring® blender and were emulsified at very high shear for 5 minutes. Optical microscopy at 500× shows emulsified LC/solvent droplets in the range of approximately 1 to 2 microns. 41.1 parts of polymer emulsion latex (10.00% polymer by weight, 0.319 micron particle size, composition is poly(BA/sty/hexanethiol), 82/18/19) were added to the emulsified LC mixture. The sample was then subjected to mild agitation for 120 minutes at 85 C. The sample was then viewed under the microscope at 500×—the particle size droplets were extremely uniform. The ethyl acetate was removed by heating the sample to 75 C. and bubbling nitrogen through the sample.

b) Monomer Swelling 55.67 parts of monomer solution (34.79 parts MMA, 8.35 parts Styrene, 11.13 parts HEMA, 1.38 parts MAA, and 1.95 parts of t-BPO) were emulsified with 0.25 parts of DOSS (75% solution in water/EtOH), and 56 parts of DI water. This mixture was added to the LC emulsion from above. In several minutes the monomer was incorporated into the uniform LC droplets.

c) Polymerization

The above mixture was diluted to 80% water by weight. The reaction mixture was added to a sealed pressure tube and subjected to mild agitation in a hot water bath at 85 C. for 1 hour and then an additional 1 hour at 95 C. The reaction tube was cooled to 25 C. in ambient air. The sample was then dried and examined by SEM microscopy. The particle size diameter was 1.25 microns.

d) PDLC Film Preparation

The 20% by weight (particles) particle emulsion was mixed at 25 C. with an emulsion polymer latex (composition is poly(2-EHA/Styrene/HEMA/MAA)=52/25/20/0.5). The ratio of dried particles to dry binder was 1:1 based on weight. 7 grams of IRN-150, mixed bed deionizing ion exchange beads available from the Rohm and Haas Company, were then added. The IRN beads remove ionics. The deionization was monitored with a conductivity probe. Initially the reading was off scale (>200 ppm). After about 30 minutes the reading was about 100 micromhos, corresponding to<100 ppm total ionics. The sample was then filtered through a burette packed with fine glass wool, and then through a 20 micron stainless steel screen. The sample was degassed under vacuum. The sample emulsion which is about 28% (based on weight) non-volatile was drawn down on a 14 inch×5 inch×1.1 millimeter ITO coated glass substrate using a 4 inch doctor blade (Gardner type), at a gap setting of 0.051 millimeters, which was set with a feeler gauge. The sample was placed in a vacuum oven overnight at 25 C. The dry film weight was calculated to be 18 microns. The density of the film was about 1 g/cm³. The next day, after further storage in a vacuum, 2 inch×3 inch samples were cut for PDLC device fabrication. ITO coated Mylar™ was used as the top substrate. The top piece was laminated by hand using a roller. The device was then sealed all around the perimeter of the device using melted paraffin wax (mp=56 C).

Figure 5:
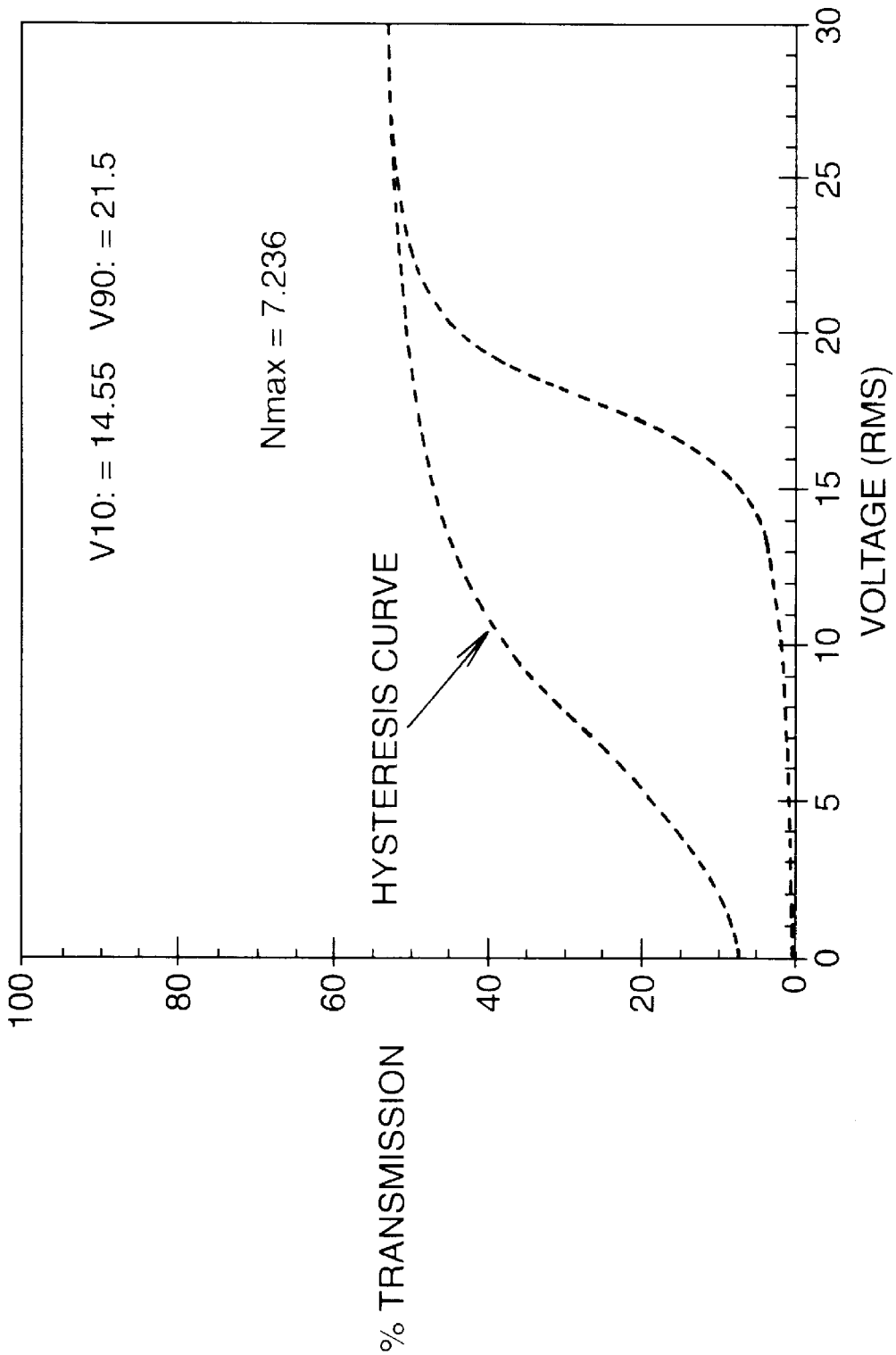
FIG. 5. Percent transmission versus voltage curve for the film of Example 8.

The sample was then tested for switching voltage using a HeNe laser and detection device. The beam was normalize to read 100% transmission through air. The percent transmission versus voltage data were collected for the beam perpendicular to the PDLC plane. The percent transmission versus voltage curve is shown in FIG. 5. The percent transmission was measured versus air. The hysteresis is 86.4%.

EXAMPLE 9

Preparation of Liquid Crystal Filled Polymer Particles with a Wide Particle Size Distribution and a Switchable PDLC a) Emulsified LC/Monomer Mixture 167 part s of TL205 liquid crystal (E-Merck), 22.8 parts of water free emulsion latex (poly(BA/sty/hexanethiol), 82/18/19)), 55.67 parts of monomer solution (34.79 parts MMA, 8.35 parts Styrene, 11.13 parts HEMA, 1.38 parts MAA, and 1.95 parts of t-BPO) 2.6 parts of DOSS (75% solution in water/EtOH), 154 parts of DI water, and 19.9 parts of methyl beta-cyclodextrin (50.8% solution in water), Wacker Company, were added to a Waring® blender and were emulsified at very high shear for 5 minutes. Optical microscopy at 500× shows emulsified LC/solvent droplets in the range of approximately 1 to 2 microns.

b) Polymerization

The above mixture was diluted to 80% water by weight. The reaction mixture was added to a sealed pressure tube and subjected to mild agitation in a hot water bath at 85 C. for 1 hour and then an additional 1 hour at 95 C. The reaction tube was cooled to 25 C. in ambient air. The sample was then dried and examined by SEM microscopy. The particle size was very broad and ranges from 1 to 20 microns in diameter. Cryofractured particles revealed a liquid-core/polymer-shell morphology.

c) PDLC Film Preparation

The 20% by weight particle emulsion were mixed at 25 C. with an emulsion polymer film-forming latex (poly(2-EHA/Styrene/HEMA/MAA), 52/25/20/0.5). The ratio of dried particles to dry binder was 1:1 by weight. 7 grams of IRN-150,-mixed bed deionizing ion exchange beads from Rohm and Haas, were then added. The IRN beads remove ionics. The deionization was monitored with a conductivity probe. Initially the reading was off scale (>200 ppm). After about 30 minutes the reading was about 100 micromhos, corresponding to<100 ppm total ionics. The sample was then filtered through a burette packed with fine glass wool, and then through a 20 micron stainless steel screen. The sample was degassed under vacuum. The sample emulsion was drawn down on a 14 inch×5 inch×1.1 millimeter ITO coated glass substrate using a 4 inch doctor blade (Gardner type), at a gap setting of 0.051 millimeters, which was set with a feeler gauge.

The sample was placed in a vacuum oven overnight at 25 C. The dry film weight was calculated to be 34 microns. The film was about 1 g/cm$^3$. The next day, after further storage in a vacuum, 2 inch×3 inch samples were cut for PDLC device fabrication. ITO coated Mylar was used as the top substrate. The top piece was laminated by hand using a roller. The device was then sealed all around the perimeter of the device using melted paraffin wax (mp=56 C).

Figure 6:
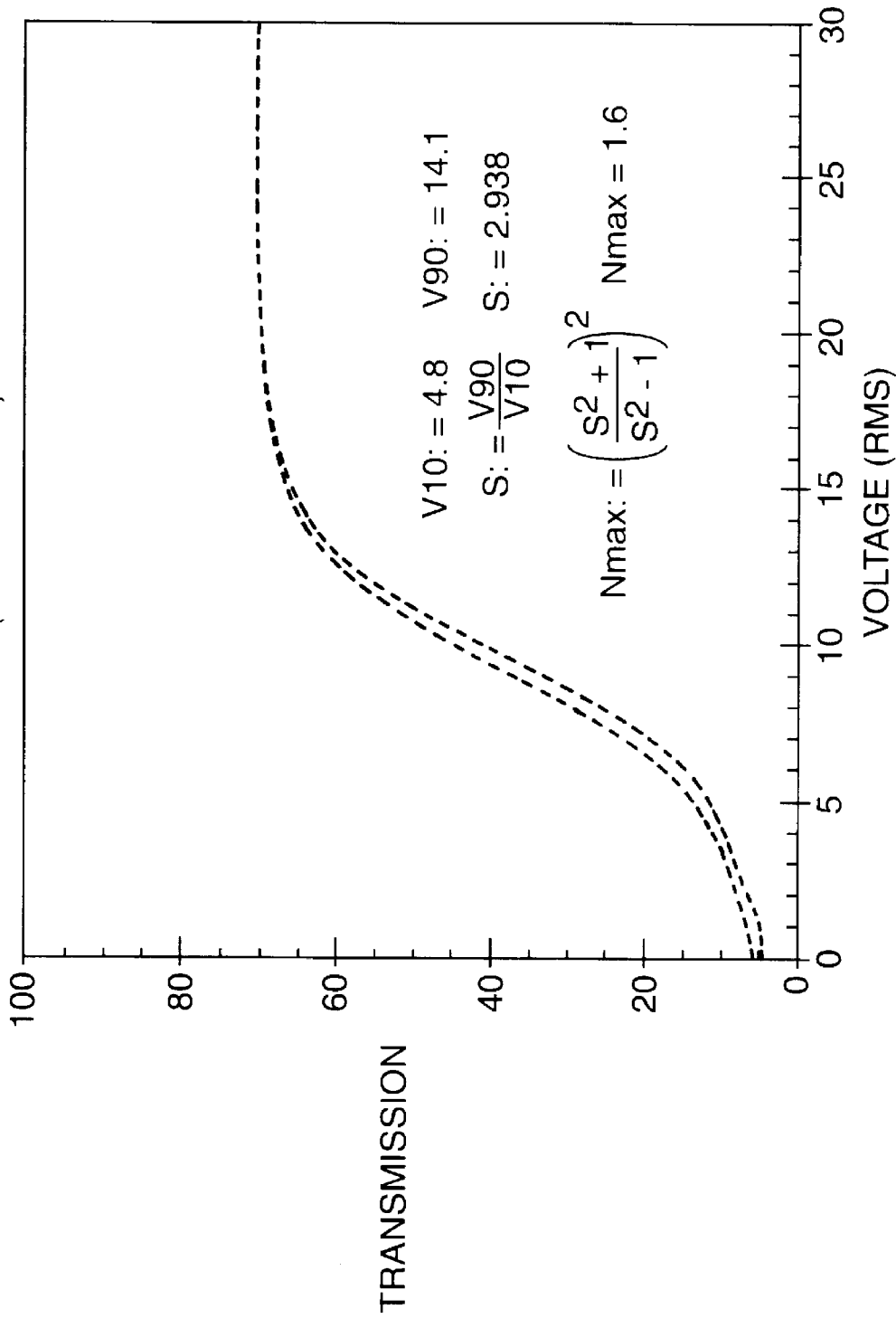
FIG. 6. Percent transmission versus voltage curve for the film of Example 9.
Figure 7:
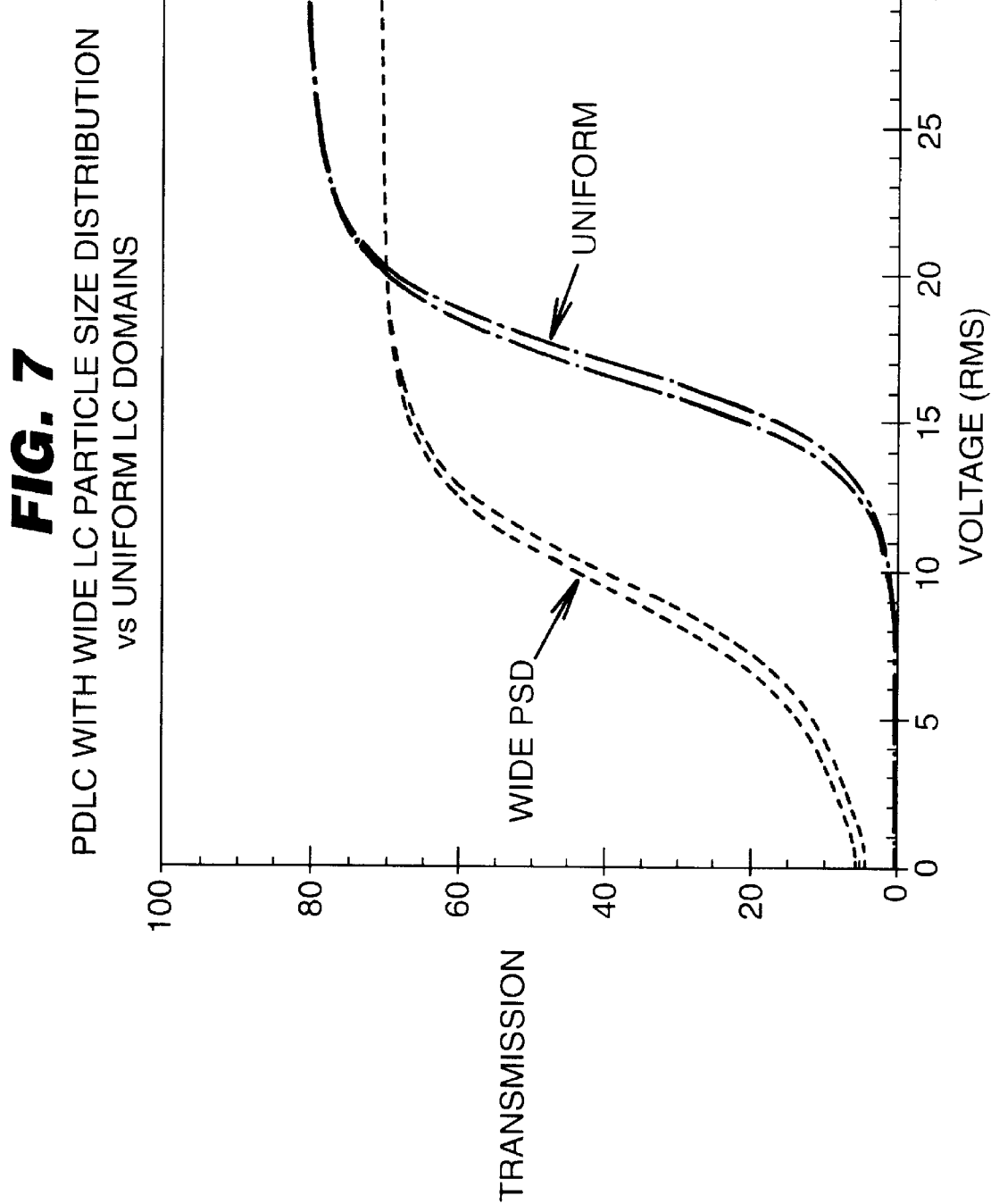
FIG. 7. Percent transmission versus voltage curve for PDLC films formed from particles with wide particle size distributions and narrow particle size distributions. $N_{max}$ for the film formed from particles with wide a distribution is 1.6 and $N_{max}$ for the film formed from particles with a narrow ditribution is 6.3.

The sample was then tested for switching voltage using a HeNe laser and detection device. The beam was normalize to read 100% transmission through air. The percent transmission versus voltage data were collected for the beam perpendicular to the PDLC plane. The percent transmission vs voltage curve is shown in FIG. 7. FIG. 6 compares the percent transmission versus voltage curves for the film prepared from particles in Example 9 (wide particle size distribuition) and Example 10 (narrow particle size distribution). The percent transmission was measured versus air.

EXAMPLE 10

Preparation of Liquid Crystal Filled Polymer Particles and a Switchable PDLC Characterized as Having Low Hystersis a) Primary Swelling 167 parts of TL205 (E-Merck) liquid crystal, 333 parts of ethyl acetate, 2.3 parts of DOSS (75% solution in water/EtOH), 98.9 parts of DI water, and 19.9 parts of methyl beta-cyclodextrin (50.8% solution in water), Wacker Company, were added to a Waring® blender and were emulsified at very high shear for 5 minutes. Optical microscopy at 500× showed emulsified LC/solvent droplets in the range of approximately 1 to 2 microns. 227.7 parts of polymer emulsion latex (10.00% polymer by weight, 0.562 micron particle size, poly(BA/sty/hexanethiol), 82/18/19), was added to the emulsified LC mixture. The sample was then subjected to mild agitation for 120 minutes at 85 C. The sample was then viewed under the microscope at 500×—the particle size droplets were extremely uniform. The ethyl acetate was removed by heating the sample to 75 C. and bubbling nitrogen through the sample.

b) Monomer Swelling 55.67 parts of monomer solution (34.79 parts MMA, 8.35 parts Styrene, 11.13 parts HEMA, 1.38 parts MAA, and 1.95 parts of t-BPO) were emulsified with 0.25 parts of DOSS (75% solution in water/EtOH), and 56 parts of DI Water. This mixture was added to the LC emulsion from above. In several minutes the monomer was incorporated into the uniform LC droplets.

c) Polymerization

The above mixture was diluted to 80% water based on weight. The reaction mixture was added to a sealed pressure tube and subjected to mild agitation in a hot water bath at 85 C. for 1 hour and then an additional 1 hour at 95 C. The reaction tube was cooled to 25 C. in ambient air. The sample was then dried and examined by SEM microscopy. The particle size diameter was 1.25 microns.

d) PDLC Film Preparation

The 20% by weight (particles) particle emulsion was mixed at 25 C. with an emulsion film-forming polymer latex (poly(2-EHA/Styrene/HEMA/MAA) 52/25/20/0.5). The weight ratio of dried particles to dry binder was 1:1. 7 grams of IRN-150 (a mixed bed deionizing ion exchange beads available from Rohm and Haas) were then added. The IRN beads remove ionics. The deionization was monitored with a conductivity probe. Initially the reading was off scale (>200 ppm). After about 30 minutes the reading was about 100 micromhos, corresponding to<100 ppm total ionics. The sample was then filtered through a burette packed with fine glass wool, and then through a 20 micron stainless steel screen. The sample was degassed under vacuum. The sample emulsion was drawn down on a 14 inch×5 inch×1.1 millimeter ITO coated glass substrate using a 4 inch doctor blade (Gardner type), at a gap setting of 0.051 millimeters, which was set with a feeler gauge. The sample was placed in a vacuum oven overnight at 25 C. The dry film weight was calculated to be 22 microns. The density of the film was about 1 g/cm$^3$. The next day, after further storage in a vacuum, 2 inch×3 inch samples were cut for PDLC device fabrication. ITO coated Mylar was used as the top substrate. The top piece was laminated by hand using a roller. The device was then sealed all around the perimeter of the device using melted paraffin wax (mp=56 C.).

Figure 8:
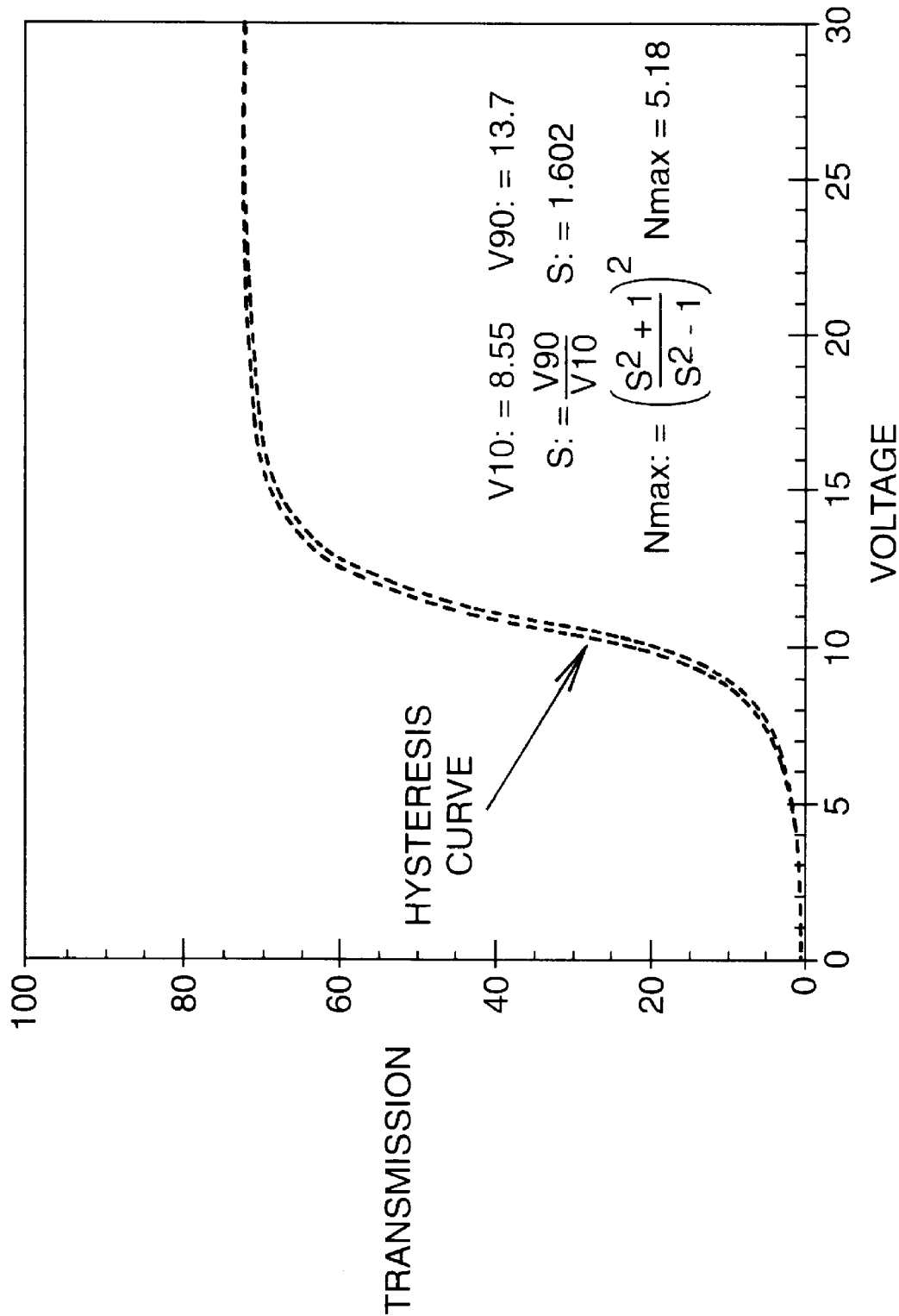
FIG. 8. Percent transmission versus voltage curve for the film of Example 10.

The sample was then tested for switching voltage using a HeNe laser and detection device. The beam was normalize to read 100% transmission through air. The percent transmission versus voltage data were collected for the beam perpendicular to the PDLC plane. The percent transmission versus voltage curve is shown in FIG. 8. The percent transmission was measured versus air. The hysteresis is 1.3%.

EXAMPLE 11

Preparation of Liquid Crystal Filled Polymer Particles and a Switchable PDLC Film a) Primary Swelling 167 parts of TL205 (E-Merck) liquid crystal, 333 parts of ethyl acetate, 2.3 parts of DOSS (75% solution in water/EtOH), 98.9 parts of DI water, and 19.9 parts of methyl beta-cyclodextrin (50.8% solution in water), Wacker Company, were added to a Waring® blender and were emulsified at very high shear for 5 minutes. Optical microscopy at 500× showed emulsified LC/solvent droplets in the range of approximately 1 to 2 microns. 227.7 parts of polymer emulsion latex (10.00% polymer by weight, 0.562 micron particle size, (poly(BA/sty/hexanethiol), 82/18/19), was added to the emulsified LC mixture. The sample was then subjected to mild agitation for 120 minutes at 85 C. The sample was then viewed under the microscope at 500×—the particle size droplets were extremely uniform. The ethyl acetate was removed by heating the sample to 75 C. and bubbling nitrogen through the sample.

b) Monomer Swelling 55.67 parts of monomer solution (38.30 parts MMA, 4.84 parts Styrene, 11.13 parts HEMA, 1.38 parts MAA, and 1.95 parts of t-BPO) were emulsified with 0.25 parts of DOSS (75% solution in water/EtOH), and 56 parts of DI Water. This mixture was added to the LC emulsion from above. In several minutes the monomer was incorporated into the uniform LC droplets.

c) Polymerization

The above mixture was diluted to 80% water by weight. The reaction mixture was added to a sealed pressure tube and subjected to mild agitation in a hot water bath at 85 C. for 1 hour and then an additional 1 hour at 95 C. The reaction tube was cooled to 25 C. in ambient air. The sample was then dried and examined by SEM microscopy. The particle size was 1.25 microns. The polymer shell composition had a theoretical refractive index of 1.503, solubility studies have shown the absorbed LC in the shell to be 25% (by weight). The RI of the shell including the absorbed LC was 1.527 and was designed to match the ordinary refractive index of the liquid crystals.

d) Saturation of Binder Latex with Liquid Crystal 50 parts of TL205 (E-Merck) liquid crystal, 0.5 parts of DOSS (75% solution in water/EtOH), 47.5 parts of DI water, and 2 parts of methyl beta-cyclodextrin (50.8% solution in water), Wacker Company, were added to a Waring® blender and were emulsified at very high shear for 5 minutes. Optical microscopy at 500× showed emulsified LC droplets in the range of 1 to 2 microns, with the majority of droplets less than 1 micron. 319 parts of polymer emulsion latex (47% polymer by weight, emulsion film-forming polymer latex poly(2-EHA/Styrene/HEMA/MAA), 52/25/20/0.5), was added to the emulsified LC mixture. The sample was then subjected to mild agitation for 120 minutes at 85 C. The sample was then viewed under the microscope at 500× for the absence of nematic LC. A film of the mixture was clear and had the correct refractive index based on 25% by weight absorbed LC in the polymer.

e) PDLC Film Preparation

The 20% by weight (particles) particle emulsion was mixed at 25 C. with an emulsion film-forming polymer latex (poly(2-EHA/Styrene/HEMA/MAA), 52/25/20/0.5) which had been presaturated with 25% by weight TL205 LC. The weight ratio of dried particles to dry binder was 1:1. 7 grams of IRN-150, (Rohm and Haas mixed bed deionizing ion exchange beads) were then added. The IRN beads remove ionics. The deionization was monitored with a conductivity probe. Initially the reading was off scale (>200 ppm). After about 30 minutes the reading was about 100 micromhos, corresponding to <100 ppm total ionics. The sample was then filtered through a burette packed with fine glass wool, and then through a 20 micron stainless steel screen. The sample was degassed under vacuum. The sample emulsion which was about 28% by weight non-volatile was drawn down on a 14 inch×5 inch×1.1 millimeter ITO coated glass substrate using a 4 inch doctor blade (Gardner type), at a gap setting of 0.051 millimeters, which was set with a feeler gauge. The sample was placed in a vacuum oven overnight at 25 C. The dry film weight was calculated to be 54 microns. The density of the film was about 1 g/cm$^3$. The next day, after further storage in a vacuum, 2 inch×3 inch samples were cut for PDLC device fabrication. ITO coated Mylar was used as the top substrate. The top piece was laminated by hand using a roller. The device was then sealed all around the perimeter of the device using melted paraffin wax (mp=56 C.).

The sample was then tested for switching voltage using a HeNe laser and detection device. The applied voltage was sine wave at 1000 hertz. Data were collected every 0.1 volts. The beam was normalize to read 100% transmission through air. The transmission versus voltage data were collected for the beam perpendicular to the PDLC plane. The $N_{max}$ values as a function of on and off voltage were shown in the following table. The electro-optical data are given in FIG. 9 showing the percent transmission versus voltage. The percent transmission was measured versus air.

| $N_{max}$ as a function of different $V_{ON}$ and $V_{OFF}$ | | | |
|---|---|---|---|
| % Transmission† Values for $V_{ON}$ and $V_{OFF}$ | | | |
| $V_{ON}$ (%) | $V_{OFF}$ (%) | $V_{ON}$, $V_{OFF}$ (volts) | Calculated $N_{max}$ |
| 10 | 90 | 18.2, 25.4 | 9.7 |
| 15 | 85 | 18.9, 24.5 | 15.5 |
| 20 | 80 | 19.4, 23.9 | 23.6 |

†The % transition in transparency from the film's most opaque state to its most transparent state.

EXAMPLE 12

Encapsulation of Biocide (SeaNine 211 Available From Rohm and Haas Co.)

a) Primary Swelling 133.6 parts of dioctylphthalate, 33.4 parts of RH-25,287 biocide (SeaNine 211, Rohm and Haas Co.), 333 parts of ethyl acetate, 2.3 parts of DOSS (75% solution in water/EtOH), 98.9 parts of DI water, and 19.9 parts of methyl beta-cyclodextrin (50.8% by weight solution in water), Wacker Company, were added to a Waring® blender and were emulsified at very high shear for 5 minutes. Optical microscopy at 500× showed emulsified solvent droplets in the range of approximately 1 to 2 microns. 113.5 parts of polymer emulsion latex (10.00% polymer by weight, 0.562 micron particle size, poly(BA/sty/hexanethiol), 82/18/19), was added to the emulsified LC mixture. The sample was then subjected to mild agitation for 120 minutes at 85 C. The sample was then viewed under the microscope at 500×—the particle size droplets were extremely uniform. The ethyl acetate was removed by heating the sample to 75 C. and bubbling nitrogen through the sample.

b) Monomer Swelling 167 parts of monomer solution (114.6 parts MMA, 14.5 parts Styrene, 33.32 parts HEMA, 4.16 parts MAA, and 5.90 parts of t-BPO) were emulsified with 0.76 parts of DOSS (75% solution in water/EtOH), and 167 parts of DI water. This mixture was added to the solvent emulsion from above. In several minutes the monomer was incorporated into the uniform droplets.

c) Polymerization

The above mixture was diluted to 80% water based on weight. The reaction mixture was added to a sealed pressure tube and subjected to mild agitation in a hot water bath at 85 C. for 1 hour and then an additional 1 hour at 95 C. The reaction tube was cooled to 25 C. in ambient air. The sample was then dried and examined by SEM microscopy. The particle size diameter was 1.72 microns and extremely uniform. Cryofractured particles revealed a polymer-shell/liquid-core morphology.

EXAMPLE 13

Preparation of PELC Particles by Polycondensation a) Primary Swelling 120.2 parts of TL205 (E-Merck) liquid crystal, 47.7 parts of Mondur MRS aliphatic isocyanate (Miles Inc.), 333 parts of ethyl acetate, 2.3 parts of DOSS (75% solution in water/EtOH), 98.9 parts of DI water, and 19.9 parts of methyl beta-cyclodextrin (50.8% by weight solution in water), Wacker Company, were added to a Waring® blender and were emulsified at very high shear for 5 minutes. Optical microscopy at 500× showed emulsified LC/solvent droplets in the range of approximately 1 to 2 microns. 201.3 parts of polymer emulsion latex (10.00% polymer by weight in water, 0.562 micron particle size, poly(BA/sty/hexanethiol), 82/18/19), were added to the emulsified LC mixture. The sample was then subjected to mild agitation for 30 minutes at 25 C. The sample was then viewed under the microscope at 500×—the particle size droplets were extremely uniform. The ethyl acetate was removed by bubbling nitrogen through the sample at 25 C.

b) Polymerization

The above mixture was diluted to 80% water by weight with a water solution containing 9 parts ethylene diamine and 3.43 parts of tetra-ethylene tertra-amine (relative to the 47.7 parts of Mondur MRS). The reaction was conducted at 25 C. The sample was then dried and examined by SEM microscopy. Fractured particles revealed LC filled polymer particles. The particle size diameter was 1.25 microns and the polydospersity is 1.004.

What is claimed is:

1. A plurality of spherical droplets, each droplet comprising: liquid crystals, dispersed in an aqueous medium, said droplets having a particle size from 0.150 microns to 15 microns in diameter and a polydispersity from 1.3 to 1.0.

2. The droplets of claim 1, further comprising one or more monomers.

3. The droplets of claim 2, wherein at least one monomer is an ethylenically unsaturated monomer.

4. The droplets of claim 1, further comprising one or more transport agents.

5. The droplets of claim 4, wherein at least one transport agent is cyclodextrin or a derivative thereof.

6. The droplets of claim 1, further comprising one or more dyes.

7. The droplets of claim 6, wherein at least one dye is a pleochroic dye.

8. A plurality of polymer particles, each particle comprising: a liquid crystal in at least one polymeric shell, wherein the plurality of particles have a size of from 0.15 microns to 15 microns and a polydispersity of from 1.3 to 10.

9. The particles of claim 8, wherein the liquid crystal is an operationally nematic liquid crystal.

10. A film formed from the particles of claim 9.

11. The particles of claim 8, further comprising at least one dye.

12. The particles of claim 11, wherein the at least one dye is a pleochroic dye.

13. A film formed from the particles of claim 12.

14. A film formed from the particles of claim 11.

15. A film formed from the particles of claim 8.

16. The particles of claim 8, wherein the at least one polymeric shell is formed by free radical polymerization of at least one ethylenically unsaturated monomer.

17. An apparatus, comprising:
   a plurality of discrete polymer particles, each particle comprising a liquid crystal in at least one polymeric shell, wherein the plurality of particles have a size of from 0.15 microns to 15 microns and a polydispersity of from 1.3 to 1.0, on a substrate.

18. The apparatus of claim 17, further comprising a second substrate wherein the plurality of polymer particles is disposed between the two substrates.

19. The apparatus of claim 18, wherein the substrate is glass or plastic.

20. The apparatus of claim 18, further comprising an electrode layer on each substrate next to the plurality of polymer particles.

* * * * *